(12) United States Patent
Borowski et al.

(10) Patent No.: US 10,977,622 B2
(45) Date of Patent: Apr. 13, 2021

(54) SMART WASTE DEVICE AND WASTE TRACKING SYSTEM

(71) Applicant: ULTRA SMART RECYCLING LLC, Green Bay, WI (US)

(72) Inventors: David V. Borowski, Green Bay, WI (US); William C. Huddleston, San Deigo, CA (US); Benjamin A. Thorp, Richmond, VA (US); William L. Klima, Fredericksburg, VA (US)

( * ) Notice: Subject to any disclaimer, the term of this patent is extended or adjusted under 35 U.S.C. 154(b) by 0 days.

(21) Appl. No.: 14/545,984

(22) Filed: Jul. 14, 2015

(65) Prior Publication Data

US 2015/0324760 A1 Nov. 12, 2015

Related U.S. Application Data

(63) Continuation-in-part of application No. 13/998,135, filed on Oct. 7, 2013, now Pat. No. 9,098,884, and a
(Continued)

(51) Int. Cl.
| *B65F 1/14* | (2006.01) |
|---|---|
| *G06Q 10/00* | (2012.01) |
| *G06K 7/10* | (2006.01) |
| *B65F 1/16* | (2006.01) |
| *B65F 1/00* | (2006.01) |
| *G06Q 99/00* | (2006.01) |
| *B65F 1/10* | (2006.01) |

(Continued)

(52) U.S. Cl.
CPC .......... *G06Q 10/30* (2013.01); *B65F 1/0006* (2013.01); *B65F 1/0066* (2013.01); *B65F 1/10* (2013.01); *B65F 1/1426* (2013.01); *B65F 1/1468* (2013.01); *B65F 1/1484* (2013.01);

*B65F 1/1638* (2013.01); *B65F 7/00* (2013.01); *G06K 7/10366* (2013.01); *G06Q 90/00* (2013.01); *G06Q 99/00* (2013.01); *B65F 2210/1123* (2013.01); *B65F 2210/1128* (2013.01); *B65F 2210/132* (2013.01); *B65F 2210/137* (2013.01); *B65F 2210/144* (2013.01); *B65F 2210/181* (2013.01)

(58) Field of Classification Search
CPC .... B65F 1/006; B65F 1/04; B65F 1/06; B65F 1/1484; B65F 2210/112; B65F 2210/1123; B65F 2210/1126; B65F 2210/1128; B65F 2210/138; B65F 2210/144; B65F 2210/15; B65F 2210/128; B07C 2501/0054; B03B 9/06; B03B 9/061; G06K 7/10366; G06Q 10/30
See application file for complete search history.

(56) References Cited

U.S. PATENT DOCUMENTS

| 5,374,394 | A | * | 12/1994 | Kralovic | ................ | A01N 25/34 |
| | | | | | | 422/28 |
| 5,447,017 | A | * | 9/1995 | Becher | ................ | B09B 3/0025 |
| | | | | | | 53/121 |

(Continued)

FOREIGN PATENT DOCUMENTS

WO  WO-0107344 A1 *  2/2001  ............ B65F 1/1484

*Primary Examiner* — Joseph C Rodriguez
(74) *Attorney, Agent, or Firm* — Klima Law; William L. Klima

(57) ABSTRACT

An electronic waste tracking device, process, and system to track waste from one location to another location.

15 Claims, 12 Drawing Sheets

Related U.S. Application Data continuation of application No. 12/958,392, filed on Dec. 1, 2010, now Pat. No. 8,550,252, and a continuation-in-part of application No. 12/754,985, filed on Apr. 6, 2010, now abandoned, and a continuation-in-part of application No. 12/585,249, filed on Sep. 9, 2009, now Pat. No. 8,459,461.

(60) Provisional application No. 61/999,835, filed on Aug. 7, 2014.

(51) Int. Cl.
    *B65F 7/00* (2006.01)
    *G06Q 90/00* (2006.01)

(56) References Cited

U.S. PATENT DOCUMENTS

| | | | | |
|---|---|---|---|---|
| 5,628,412 A * | 5/1997 | Hulls | B03B 9/06 | 209/702 |
| 6,305,548 B1 * | 10/2001 | Sato | B09B 5/00 | 209/3.3 |
| 6,766,751 B2 * | 7/2004 | Liu | B65F 1/1484 | 110/341 |
| 7,248,164 B2 * | 7/2007 | Regard | G06Q 20/203 | 340/568.5 |
| 8,204,620 B2 * | 6/2012 | Mallett | A61L 11/00 | 700/236 |
| 8,459,461 B2 * | 6/2013 | Borowski | B65F 1/0006 | 209/3 |
| 8,550,252 B2 * | 10/2013 | Borowski | G06Q 99/00 | 209/3 |
| 9,090,399 B2 * | 7/2015 | Sundholm | B07C 5/3412 | |
| 9,098,884 B2 * | 8/2015 | Borowski | G06Q 99/00 | |
| 9,302,846 B2 * | 4/2016 | Bell | B65F 1/06 | |
| 9,532,685 B2 * | 1/2017 | Schaaf | A47K 11/02 | |
| 2002/0145063 A1 * | 10/2002 | Mosenson | A61L 11/00 | 241/36 |
| 2004/0133484 A1 * | 7/2004 | Kreiner | B07C 5/3412 | 705/28 |
| 2005/0209825 A1 * | 9/2005 | Ogawa | B65F 1/1484 | 702/188 |
| 2006/0187058 A1 * | 8/2006 | Regard | G06Q 20/203 | 340/572.8 |
| 2007/0260466 A1 * | 11/2007 | Casella | B65F 1/1484 | 705/1.1 |
| 2007/0262878 A1 * | 11/2007 | Maruca | G06Q 10/06 | 340/686.1 |
| 2008/0197059 A1 * | 8/2008 | Mallett | B07C 5/3412 | 209/702 |
| 2008/0296374 A1 * | 12/2008 | Gonen | B65F 1/1484 | 235/385 |
| 2009/0008298 A1 * | 1/2009 | Studley | B03B 9/06 | 209/2 |
| 2010/0217715 A1 * | 8/2010 | Lipcon | G06Q 10/00 | 705/308 |
| 2011/0186624 A1 * | 8/2011 | Wagner | B07C 7/005 | 235/375 |
| 2011/0225098 A1 * | 9/2011 | Wolff | G06Q 10/30 | 705/308 |
| 2011/0230699 A1 * | 9/2011 | Reese | B03B 9/06 | 588/252 |
| 2012/0010746 A1 * | 1/2012 | Sundholm | B07C 5/3412 | 700/226 |
| 2012/0168354 A1 * | 7/2012 | Sundholm | B07C 5/3412 | 209/10 |
| 2013/0175373 A1 * | 7/2013 | Morgan | B02C 23/00 | 241/36 |
| 2013/0332238 A1 * | 12/2013 | Lyle | G06Q 30/0205 | 705/7.34 |
| 2014/0122347 A1 * | 5/2014 | Moran | G06Q 10/30 | 705/308 |
| 2014/0202116 A1 * | 7/2014 | Bell | B65F 1/06 | 53/425 |
| 2015/0324760 A1 * | 11/2015 | Borowski | B65F 1/0006 | 705/308 |
| 2017/0008671 A1 * | 1/2017 | Whitman | B65D 21/086 | |
| 2018/0268379 A1 * | 9/2018 | Collins | G06Q 10/30 | |

\* cited by examiner

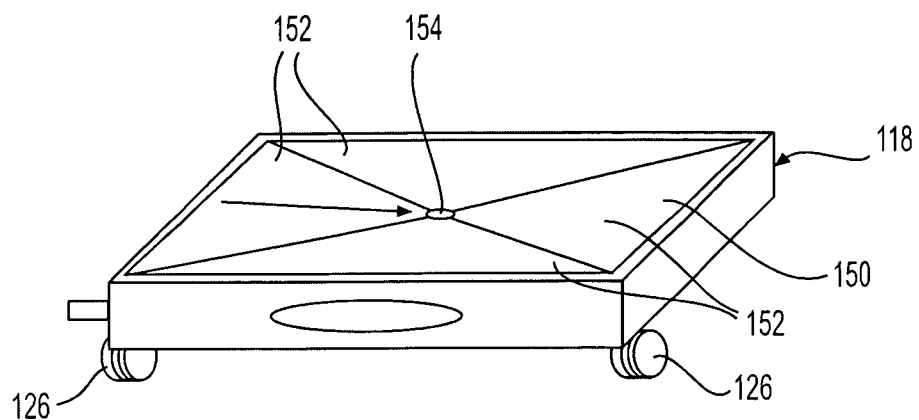
FIG. 9
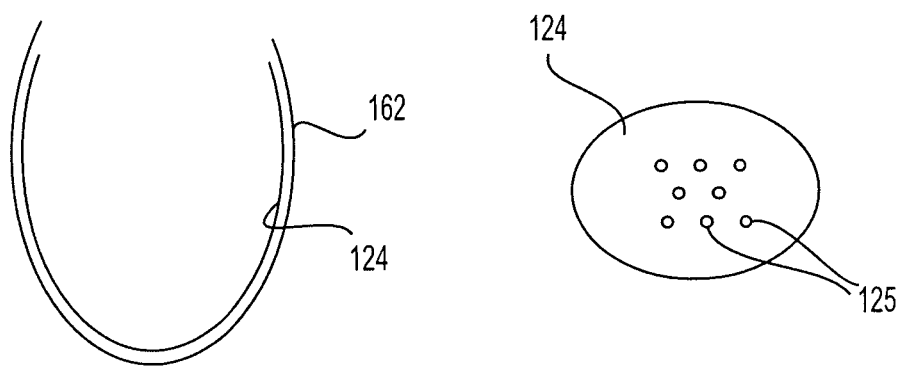
FIG. 10  FIG. 11

SMART WASTE DEVICE AND WASTE TRACKING SYSTEM

RELATED APPLICATIONS

This is a Continuation-In-Part (CIP) of U.S. patent application entitled "Waste Recycling Systems, Processes, and Methods", application Ser. No. 13/998,135 filed on Oct. 7, 2013, which is a Continuation of U.S. patent application entitled "Waste Recycling Systems, Processes, and Methods", application Ser. No. 12/958,392 filed on Dec. 1, 2010, issued as U.S. Pat. No. 8,550,252, which is a Continuation-In-Part (CIP) of U.S. patent application entitled "A Waste Collection Device, and Waste Recycling System", application Ser. No. 12/754,985 FILED ON Apr. 6, 2010, which is a Continuation-In-Part of U.S. patent application entitled "A Waste Recycling System Using Tagged, Bar Coded, or Other Distinctively Marked Containers, Method of Recycling, and Container Device", application Ser. No. 12/585,249, filed Sep. 9, 2009, issued as U.S. Pat. No. 8,459,461, and all applications being incorporated by reference herein. This application also claims priority to U.S. Provisional Patent Application No. 61/999,835 filed on Aug. 7, 2014.

FIELD

A smart waste device for electronically tracking waste, and system of tracking the waste from one location to another location.

BACKGROUND

Today, much waste or waste material from homes, residences, businesses, stores, convenience stores, fast food chains, restaurants, retail locations, offices, schools, and commercial, institutional, and government environments or locations is discarded by individuals (e.g. mainly homeowners, renters, occupants, workers, consumers, employees, students) into waste receptacles (e.g. waste containers such as trash containers, trash receptacles, trash cans, garbage containers, garbage receptacles, and garbage cans) provided onsite. These waste receptacles typically are fitted with disposable plastic bags, which can be closed when filled, removed from the waste receptacles, and then disposed of in waste containers (e.g. trash cans, garbage cans, and dumpsters) usually located outside the buildings and/or adjacent to the parking lots of these locations to facilitate removal by a waste disposal service.

Typically, the waste is not sorted onsite, and all different types of waste are discarded into the same waste receptacles resulting in a wide variety of waste mixed together, including trash, garbage, paper products plastic products, food waste, and other waste items defining a general waste stream. The plastic bags filled with waste are thrown into a garbage can or dumpster, and mixed with other loose waste or plastic bags containing waste. This waste is transported in dumpsters or garbage trucks to landfills, and typically not sorted before land filling.

Currently, there exists a need to recover materials, which requires separating or sorting waste into targeted waste to allow this particular waste to be effectively recycled. Once certain types of waste are mixed together, even subsequent separating or sorting may not allow the waste to be recycled due to the contamination of the targeted waste with other types of waste. In particular, waste food and beverage products (e.g. paper products, paper cups, paper plates, paper containers, plastic products, plastic cups, plastic containers, foam products, foam cups, foam plates, foam containers, cardboard products) should be handled and/or processed to minimize contaminants. For example, these waste food and beverage product should not be mixed with other types of waste to avoid being contaminated to allow these types of waste to be recycled into new products suitable for contact and use with food and beverage that meet the standards and guidelines of the Food and Drug Administration (FDA). Further, to ensure proper handling of the waste food and beverage products, the custody of this waste from the point of disposal (e.g. store located waste receptacle) through the point of recycling of this waste must be established, tracked, maintained, and verified to assure no additional contamination thereof. Thus, it is preferred that this type of waste be immediately separated or sorted at the onsite location, and maintained separate from the general or mixed waste stream throughout collecting, transporting, storing, and recycling thereof. However, if maintained separate in the way described here it can be economically co-transported from facility to facility.

Due to the large amount of labor involved with sorting, it is desirable that consumers (e.g. individuals, end users, customers, students, employees, workers, contractors) of food and beverage products immediately begin the process of sorting the waste food and beverage products by placing these items in marked waste collection containers (e.g. receptacles, bins, vessels). For example, consumers immediately place used paper cups or plastic bottles into separately marked waste collection containers to begin the process of effectively sorting particular types of waste. The marked waste collection containers, preferably contain a removable disposable bag(s) or liner(s), which when filled can be removed and then disposed of into waste containers such as garbage cans and dumpsters.

In the recycling of paper cups and paper plates, the paper substrate is of a high quality paperboard stock, which has been treated with a plastic, wax, or resin coating process to make the paperboard resistant to water penetration and resulting degradation. It is desirable to be able to recycle this particular type of paper stock into long fiber pulp and/or food grade paperboard suitable for manufacturing paper cups, paper plates, and other direct food contact type products and containers, while maintaining a sanitary environment and ensuring a high degree of custody and segregation to avoid the inclusion of unnecessary hazardous or deleterious materials in the new products.

Due to increasing public, private, and government awareness and interest in "going green" and being environmentally friendly, there exists renewed interest and demand for recycled products having greater percentages of recycled material content. Thus, this demand will require new and effective systems and methods of recycling waste into renewable products.

In most store, retail, office, school, commercial, institutional, and government environments or locations, simple waste receptacles (e.g. trash containers, trash cans, garbage containers, garbage cans) are still used today to collect and remove waste from these environments or locations. Again, it is common to provide disposable plastic bags or liners in waste receptacles to facilitate removal and transfer of the waste to garbage cans and dumpsters and to maintain a sanitary condition of the waste receptacles. In order to recycle the waste, in particular targeted waste to be recycled into food grade new products (e.g. paper cups, plastic cups, foam cups, paper plates, plastic plates, foam plates, paper bowls, plastic bowls, foam bowls, plastic utensils), it is desirable to treat the waste prior to and/or during the collecting, storing, transporting, and recycling stages or steps. In particular, it is desirable to densify the waste to reduce its volume, disinfect, and remove water or liquid from the waste to prevent deterioration of the waste (e.g. breaking down of the waste chemically or biologically) to maintain the high quality of the waste material to be recycled, particularly waste to be recycled into food grade or contact recycled products.

Further, it is desirable to collect the waste immediately after use by the consumer, in particular at the onsite environment or location, again to obtain the waste material to be recycled before any deterioration thereof. For example, new paper products are typically placed in contact or filled with food and beverage at store (e.g. fast food establishments, cafés, restaurants, food courts, markets, convenience stores), retail, office, school, commercial, institutional, and government environments or locations, and then immediately consumed onsite. Thus, it is desirable to provide a waste collection device onsite that is configured to operate onsite, and capable of safely and effectively interfacing with consumers. The waste collection device is configured to treat the waste being discarded by mechanical treatment (e.g. shredding, compressing, mechanism and limit consumer contamination, light treatment (e.g. laser, UV, IR), disinfecting, removing water, treating with air, chemicals, gases, and treating with pressure, vacuum, and heat. It is particularly desirable to treat the waste immediately upon being discarded into the waste collection device, however, additional or timed treatments can be applied inside or within the waste collection device, again to maintain the high quality of the stock material to be recycled.

Current Waste Recycling

Recently, there are some stores attempting to separate and collect different types of waste by using multiple waste receptacles marked for a particular type of waste. However, it is not evident if this separated waste is stored, maintained, and/or picked up separately from these stores based on the particular type of waste, or subsequently mixed together, for example, by being thrown together into the same dumpster prior to transportation from a store.

By far the most common waste disposal method used by consumers, is to dispose all types of waste into a common waste receptacle resulting in immediate mixing and contamination of the waste. Specifically, waste paper products, plastic products, and food waste end up being thrown into the same common waste receptacle, and then typically subsequently transferred to a garbage can or dumpster for transportation to a waste disposal location (e.g. land fill) or a waste collection/processing location. The waste is immediately contaminated while sitting in the individual disposable container, and continues to be further contaminated with time, transportation, and handling prior to final disposal, collection and/or processing.

There currently appears to be no devices, systems, processes, or methods of marking, tagging, and otherwise identifying waste receptacles and waste containers to maintain the identification of the type of waste contained in each individual waste receptacle and waste container. Further there appears to be no devices, systems, processes, or methods of tracking individual disposable or recyclable waste containers (e.g. plastic bags, paper bags, cardboard boxes) from the point of collection, being moved around within the store, transported from the store, being moved around in a waste collection or processing center, being transported to a waste recycling location, and to the point of being recycled. Even further, there appears to be no devices, systems, processes, or methods of maintaining and verifying the custody of separated waste, in particular targeted waste, contained in disposable or recyclable waste containers from the point of collection to the point of recycling to ensure that the waste remains uncontaminated at the time and place of recycling.

SUMMARY

A waste tracking device, waste tracking system, process, and method.

An improved waste collection device, waste recycling system, process, and method.

A waste collection device configured to disinfect waste and system, process, and method of disinfecting waste.

A waste collection device configured to disinfect waste as the waste is being discarded into the waste collection device, and system, process and method of disinfecting waste as the waste is being discarded into a waste collection device or waste container.

A waste collection device configured to remove water or liquid from the waste, and system, process, and method of removing water or liquid from waste.

A waste collection device configured to remove water or liquid from the waste while the waste is being contained or stored in the waste collection container, and system, process, and method of removing water or liquid from waste.

A waste collection device configured to disinfect and remove water or liquid from the waste, and a system, process, and method of disinfecting and/or removing water or liquid from waste.

A waste collection device configured to simultaneously disinfect and remove water or liquid from the waste, and a system, process, and method of simultaneously disinfecting and removing water or liquid from waste.

A waste collection device configured to densifying or debulking waste.

A waste collection device configured to flatten and penetrate waste.

A waste collection device configured to remove water or liquid from the waste and then disposing the water or liquid from the water collection device to a remote location, and a system, process, and method of removing water or liquid from waste and disposing the water or liquid.

A waste collection device configured to remove water or liquid from the waste and collect the water or liquid to be removed batch-wise from the waste collection device, and a system, process, and method of removing water or liquid from waste and collecting the water or liquid to be removed batch-wise from a waste collection device.

A waste collection device configured to remove water or liquid from the waste and collect the water in a paper pad impregnated with high liquid absorbing polymers, and then disposing of the water/liquid filled paper pad.

A waste recycling system, including a waste recycling device according to the present invention, and a system, process, and method of waste recycling with a waste recycling device.

A waste recycling system, including the waste collection device according to the present invention using tags or tagged disposable containers such as bags, liners, and/or boxes, in particular tags automatically dropped into a bag as part of the system or electronically tagged disposable bags provide with an RFID tag, and system, process, and method of tagging disposable containers such as bags, liners or boxes, in particular a system, process, and method, including the step of electronically tagging disposable containers such as bags, liners, and/or boxes.

A waste recycling system, process, and method, including marking, tagging, and/or bar coding containers, in particular disposable containers such as bags, liners, boxes, and/or other disposable containers, for example, plastic containers, plastic bags, plastic liners, plastic boxes, paper containers, paper bags, paper liners, cardboard containers, cardboard boxes, composite bags, paper/plastic composite bags, for collecting waste.

A waste recycling system, process and method, including marking, electronically tagging, and/or bar coding containers, in particular disposable containers such as bags, liners, boxes, and/or other disposable containers.

A waste recycling system, process, and method, including marking, tagging, bar coding containers, in particular disposable containers such as bags, liners, boxes, and/or other disposable containers containing targeted waste immediately upon being discarded and prior to entering a general waste stream or recyclable waste stream.

A waste recycling system, process, and method, including marking, tagging, electronically tagging, and/or bar coding disposable containers such as bags, liners, and/or boxes, and identifying the marked, tagged, electronically tagged, and/or bar coded disposable containers.

A recycling system, process, and method, including sorting, preferably electronically sorting marked, tagged, electronically tagged, and/or bar coded disposable containers such as bags, liners, and/or boxes containing a targeted waste from a general waste stream or recyclable waste stream.

A waste tracking system, process, and method, including tracking waste from one location to another location.

A waste recycling collection system, process, and method, including tracking targeted waste from a waste receptacle to a recycling process to maintain custody of the targeted waste.

A waste recycling system, process, and method, including electronically tagging disposable containers such as bags, liners, and/or boxes with at least one RFID, UHFID, or other wireless electronic tags to allow identifying and sorting of the disposable containers, for example, from a general waste stream or recyclable waste stream.

An electronically tagged container, in particular disposable container such as a bag, liner, and/or box for use in the waste collection device.

An electronically tagged container, in particular a disposable container such as a bag, liner, and/or box, including at least one RFID, UHFID, or other wireless electronic tag for use in the waste collection device according to the present invention.

A container, in particular and disposable container such as a bag, liner, and/or box, including an electronic tag, for example, at least one RFID, UHFID, or other wireless electronic tag for electronically tagging the disposable container and targeted waste contents thereof.

A waste recycling system, process, and method, including marking, tagging, electronically tagging, and/or bar coding disposable containers such as bags, liners, and/or boxes, and measuring at least one at least one specification of each tagged disposable container such as its weight, volume, contents, tracking number, point of collection, point of intermediate and final destinations, quality information, store information, waste owner information, disposer information, and/or recycler information.

A waste recycling system, process, and method, including sorting tagged, in particular electronically tagged disposable containers such as bags, liners, and/or boxes at a waste collection/processing location so that the disposable containers filled with targeted waste can be routed to particular waste recycling locations.

An improved waste recycling system, process, and method.

A waste recycling system, process, and method, including collecting targeted waste.

A waste recycling system, process, and method, including sorting containers, in particular disposable containers containing targeted waste.

A waste recycling system, process, and method, including separating particular types of targeted waste into one or more waste receptacles by consumers, and tagging the targeted waste at the waste receptacle.

A waste recycling system, process, and method, including separating particular types of targeted waste into one or more waste receptacles by consumers upon initial disposal thereof.

A waste recycling system, process, and method, including tracking waste, in particular electronically tracking waste.

A waste recycling system, process, and method, including separating waste and tracking waste, in particular targeted waste.

A waste recycling system, process, and method, including tracking separated waste.

A waste recycling system, process, and method, including tracking waste containers containing waste.

A waste recycling system, process, and method, including separating waste and tracking waste containers containing waste.

A waste recycling system, process, and method, including tracking waste from a waste receptacle to a waste recycling location.

A waste recycling system, process, and method, including tagging waste.

A waste recycling system, process, and method, including tagging containers containing waste.

A waste recycling system, process, and method, including tagging containers containing separated waste.

A waste recycling system, process, and method for recycling post consumer paperboard, plastic based fast food service items, and food waste.

A system, process, and method for recycling of post consumer paperboard, plastic based food service items, and/or food waste, comprising the step of collecting of post consumer paperboard, plastic based food service items, and food waste, preferably at an on-site consumer location.

A system, process, and method of recycling post consumer paperboard or plastic based food service items, comprising the step of volume reducing the collected post consumer paperboard and plastic based food service items, preferably at an on-site consumer location.

A system, process, and method of recycling post consumer paperboard or plastic based food service items, comprising the step of treating the collected post consumer paperboard and plastic based food service items to minimize the growth of bacteria, virus, bugs, mold, and fungi during the collection process, preferably at an on-site consumer location.

A system, process, and method of recycling post consumer paperboard or plastic based food service items, comprising the step of separating of the collected post consumer paperboard and plastic based food service items from any water or liquid contained therein, preferably at an on-site consumer location.

A system, process, and method of recycling post consumer paperboard or plastic based food service items, comprising the step of containing and treating of any water or liquid separated from the post consumer paperboard and plastic based food service items.

A system, process, and method of recycling post consumer paperboard or plastic based food service items, comprising the step of packaging of the post consumer paperboard based food service items.

A system, process, and method of recycling post consumer paperboard or plastic based food service items, comprising the step of treating disposable waste containers for post consumer paperboard or plastic based food service items to minimize the growth of bacteria, virus, mold, and fungi during transport and storage.

A system, process, and method of recycling post consumer paperboard or plastic based food service items, comprising the step of credentialing disposable waste containers containing post consumer paperboard based food service items using visual and/or electronic mechanism(s).

A system, process, and method of recycling post consumer paperboard or plastic based food service items, comprising the step of co-transporting disposable waste containers containing post consumer paperboard based food service items with other co-transported materials or waste.

A system, process, and method of recycling post consumer paperboard or plastic based food service items, comprising the step of identifying and locating disposable waste containers containing co-transported post consumer paperboard or plastic based food service items amidst the other co-transported materials or waste.

A system, process, and method of recycling post consumer paperboard based food service items, comprising the step of segregating post consumer paperboard or plastic based food service items from other co-transported materials.

A system, process, and method of recycling post consumer paperboard or plastic based food service items, comprising the step of aggregating post consumer paperboard or plastic based food service items.

A system, process, and method of recycling post consumer paperboard or plastic based food service items, comprising the step of transporting disposable waste containers containing post consumer paperboard or plastic based food service items.

A system, process, and method of recycling post consumer paperboard based food service items, comprising the step of separating the transported disposable waste containers containing post consumer paperboard or plastic based food service items.

A system, process, and method of recycling post consumer paperboard or plastic food service items, comprising the step of washing the post consumer paperboard or plastic based food service items and to remove any residual food or contaminants.

A system, process, and method of recycling post consumer paperboard or plastic food service items, comprising the step of washing the post consumer paperboard or plastic based food service items and paper based materials such as napkins, towels and other non-targeted materials to remove any residual food or contaminants, and collecting the non-targeted materials to add to water-proof coatings to make a fuel pellet.

A system, process, and method of recycling post consumer paperboard food service items, comprising the step of pulping the post consumer paperboard based food service items or materials to separate cellulose fibers from water-proof coatings.

A system, process, and method of recycling post consumer paperboard food service items, comprising the step of selectively removing contaminants only to levels of suitable purity to reduce processing costs.

A system, process, and method of recycling post consumer paperboard food service items, comprising the step of extracting cellulose fibers from the pulper.

A system, process, and method of recycling post consumer paperboard food service items, comprising the step of sequestering waterproof coatings as a residual in the pulper.

A system, process, and method of recycling post consumer paperboard food service items, comprising the step of screening the cellulose fibers to further remove any contaminants.

A system, process, and method of recycling post consumer paperboard food service items, comprising the step of centrifugally cleaning the cellulose fibers to remove contaminants.

A system, process, and method of recycling post consumer paperboard food service items, comprising the step of bleaching the cellulose fibers.

A system, process, and method of recycling post consumer paperboard food service items, comprising the step of dewatering the cellulose fibers.

A system, process, and method of recycling post consumer paperboard food service items, comprising the step of drying the cellulose fibers.

A system, process, and method of recycling post consumer paperboard food service items, comprising the step of recovering energy from the waterproof coatings.

A system, process, and method of recycling post consumer paperboard food service items, comprising the step of recovering energy from the waterproof coatings combined with other non-targeted materials.

A system, process, and method of recycling post consumer paperboard or plastic food service items, comprising the step of collecting post consumer paperboard or plastic food service items by providing a multi-compartment waste receptacle resident in the food service establishment to encourage the pre-sorting of materials by the consumer.

A system, process, and method of recycling post consumer paperboard food service items, comprising the step of collecting post consumer paperboard or plastic food service items using a waste collection device, including an automated door to allow for "hands free" collection.

A system, process, and method of recycling post consumer paperboard or plastic food service items, comprising the step of reducing in bulk post consumer paperboard or plastic food service items by cutting, grinding, shredding, tearing, perforating, rolling, compressing, mechanically compromising, chemically compromising, electrically compromising, or otherwise disassembling the waste to allow water or liquid to drain from the waste and reduce the potential of water, liquid, and/or food entrapment, and in a manner so as not to damage the waste.

A system, process, and method of recycling post consumer paperboard or plastic food service items, comprising the step of irradiating the post consumer paperboard or plastic food service items to preclude the growth of bacteria, virus, bugs, mold, and/or fungi.

A system, process, and method of recycling post consumer paperboard food service items, comprising the step of employing chemical (e.g. liquid and/or solid) reagents to treat the collected waste to preclude the growth of bacteria, virus, bugs, mold and/or fungi.

A system, process, and method of recycling post consumer paperboard or plastic food service items, comprising the step of using a disposable or recyclable waste container in a waste collection device according to the present invention for packaging processed waste.

A system, process, and method of recycling post consumer paperboard food service items, comprising the step of providing the disposable or recyclable waste container in the waste collection device according to the present invention with at least one drain to allow any water or liquid to drain from the disposable or recyclable waste container and be separated from the food service items.

A system, process, and method of recycling post consumer paperboard food service items, comprising the step of sequestering any separated waste or liquid, which drains from a disposable or recyclable waste container within the waste collection device.

A system, process, and method of recycling post consumer paperboard food service items, comprising the step of treating any water or liquid separated within the waste collection device according to the present invention to prevent growth of bacteria, virus, bugs, mold, or fungi.

A system, process, and method of recycling post consumer paperboard or plastic food service items, comprising the step of absorbing separated water or liquid within the waste collection device.

A system, process, and method of recycling post consumer paperboard or plastic food service items, comprising the step of absorbing separated water or liquid within the waste collection device using structured absorbent material such as towel, napkins, meat pads and/or fruit pads containing a measured amount of super absorbent polymer (SAP).

A system, process, and method of recycling post consumer paperboard or plastic food service items, comprising the step of absorbing separated water or liquid within the waste collection device according to the present invention using super absorbent polymers contained in a fiber matrix pad (e.g. diaper or mini-pad with a non-woven wrap around material that lets waste liquid or water inside, and with a plastic handle or non-woven handle to make it easy to remove without having an operator touch).

A system, process, and method of recycling post consumer paperboard or plastic food service items, comprising the step of transporting the post consumer paperboard or plastic food service items using an over wrap transport waste container.

A system, process, and method of recycling post consumer paperboard or plastic food service items, comprising the step of transporting the post consumer paperboard or plastic food service items using an over wrap transport waste container constructed of low density polyethylene (LDPE), linear low density polyethylene (LLDPE), or high density polyethylene (HDPE).

A system, process, and method of recycling post consumer paperboard or plastic food service items, comprising the step of transporting the post consumer paperboard or plastic food service items using over wrap transport waste container impregnated with biocides to inhibit the growth of bacteria, virus, bugs, mold, and fungi.

A system, process, and method of recycling post consumer paperboard or plastic food service items, comprising the step of transporting the post consumer paperboard or plastic food service items using over wrap transport waste containers including a mechanism for the generation of inert gas.

A system, process, and method of recycling post consumer paperboard or plastic food service items, comprising the step of transporting the post consumer paperboard or plastic food service items using over wrap transport waste containers each equipped with a visual identification feature which is capable of being read by machine.

A system, process, and method of recycling post consumer paperboard or plastic food service items, comprising the step of transporting the post consumer paperboard or plastic food service items using over wrap transport waste containers equipped with an electronic identification device employing radio frequency technology.

A system, process, and method of recycling post consumer paperboard or plastic food service items, comprising the step of transporting the post consumer paperboard or plastic food service items using transport waste containers containing the post consumer paperboard or plastic food service items mixed with other recyclables, garbage, or trash for pickup.

A system, process, and method of recycling post consumer paperboard or plastic food service items, comprising the step of transporting the post consumer paperboard or plastic food service items using transport waste containers for other recyclables, garbage, or trash for existing recyclable or trash purveyors.

A system, process, and method of recycling post consumer paperboard or plastic food service items, comprising the step of transporting the post consumer paperboard or plastic food service items using a GPS signal to notify trash purveyors that waste is ready to be picked up and transported.

A system, process, and method of recycling post consumer paperboard or plastic food service items, comprising the step of transporting the post consumer paperboard or plastic food service items with other recyclable, garbage, or trash, and offloading the mixed waste at a recycling substation or municipal recycling facility.

A system, process, and method of recycling post consumer paperboard or plastic food service items, comprising the step of using electronic interrogators (e.g. readers) employed at a recycling substation or municipal recycling facility to locate and record the transport waste containers.

A system, process, and method of recycling post consumer paperboard or plastic food service items, comprising the step of segregating transport containers using the information from the electronic interrogators.

A system, process, and method of recycling post consumer paperboard or plastic food service items, comprising the step of manually segregating transport waste containers using the location established by the electronic interrogators.

A system, process, and method of recycling post consumer paperboard or plastic food service items, comprising the step of segregating transport containers using an automated device, which derives location coordinates from the electronic interrogators.

A system, process, and method of recycling post consumer paperboard or plastic food service items, comprising the step of aggregating transport containers and baling the aggregated transport containers using a baling press to compact and bundle multiple transport waste containers.

A system, process, and method of recycling post consumer paperboard or plastic food service items, including the step of transporting multiple bundles of transport waste containers from the recycling substation or MURF to a central processing facility.

A system, process, and method of recycling post consumer paperboard food service items, comprising the step of offloading and staging bundles of transport waste containers are offloaded and staged at a central processing facility.

A system, process, and method of recycling post consumer paperboard or plastic food service items, comprising the step of removing wires used to secure bundled transport waste containers.

A system, process, and method of recycling post consumer paperboard or plastic food service items, comprising the step of singulating bundled transport waste containers using a series of gates and moving belts.

A system, process, and method of recycling post consumer paperboard or plastic food service items, comprising the step of electronically polling transport waste containers to establish their unique identity.

A system, process, and method of recycling post consumer paperboard or plastic food service items, comprising the step of individually weighing transport waste containers with waste content.

A system, process, and method of recycling post consumer paperboard or plastic food service items, comprising the step of merging the weights to identify transport containers to create a chain of custody and transfer record.

A system, process, and method of recycling post consumer paperboard or plastic food service items, comprising the step of cutting transport waste containers using high pressure water jets.

A system, process, and method of recycling post consumer paperboard or plastic food service items, comprising the step of separating transport waste containers from post consumer food service items using a shaker screen.

A system, process, and method of recycling post consumer paperboard or plastic food service items, comprising the step of segregating and collecting empty transport waste containers.

A system, process, and method of recycling post consumer paperboard food service items, comprising the steps of collecting and transporting post consumer food service items to a washing vessel.

A system, process, and method of recycling post consumer paperboard food service items, comprising the step of washing the post consumer food service items using hot water and surfactants to remove food and/or liquid residual contaminants.

A system, process, and method of recycling post consumer paperboard or plastic food service items, comprising the steps of collecting and transporting the post consumer food service items to a batch and/or continuous pulper.

A system, process, and method of recycling post consumer paperboard food service items, comprising the step of re-pulping post consumer paperboard food service items using hot water and chemicals to separate the cellulose fibers from each other and from any waterproof coatings.

A system, process, and method of recycling post consumer paperboard food service items, comprising the step of extracting cellulose fibers, predominantly long fibers originating from Southern bleached softwood pulp.

A system, process, and method of recycling post consumer paperboard food service items, comprising the step of removing cellulose fibers using a pulper having a perforated or slotted extraction plate in the bottom or extracting end of the pulper.

A system, process, and method of recycling post consumer paperboard food service items, comprising the step of removing cellulose fibers using a pulper having holes or slots in the extraction plate that are too small to allow the passage of waterproof coating flakes.

A system, process, and method of recycling post consumer paperboard food service items, comprising the step of collecting waterproof coating flakes remaining in the pulper.

A system, process, and method of recycling post consumer paperboard food service items, comprising the step of dewatering collected waterproof coating flakes using a screw press or similar device.

A system, process, and method of recycling post consumer paperboard food service items, comprising the step of burning dewatered waterproof coating flakes or otherwise processed to extract energy and/or make a product that can be used as part of another product.

A system, process, and method of recycling post consumer paperboard food service items, comprising the step of screening extracted cellulose fibers at atmospheric pressure using side hill screens equipped with perforated or slotted screen plates.

A system, process, and method of recycling post consumer paperboard food service items, comprising the step of pressure screening cellulose fibers using slots ranging in size from 0.008 to 0.004 inches.

A system, process, and method of recycling post consumer paperboard food service items, comprising the step of cleaning cellulose fibers using a low density centrifugal cleaner to remove particles that are heavier than cellulose (i.e. Forward Cleaning)

A system, process, and method of recycling post consumer paperboard food service items, comprising the step cleaning cellulose fibers using a low density centrifugal cleaner to remove particles that are lighter than cellulose (Reverse Cleaning)

A system, process, and method of recycling post consumer paperboard food service items, comprising the step of de-inking cellulose fibers using a flotation device.

A system, process, and method of recycling post consumer paperboard food service items, comprising the step of color stripping cellulose fibers using bleach and/or other chemical agents.

A system, process, and method of recycling post consumer paperboard food service items, comprising the step of dewatering the cellulose fibers using mechanical means and formed into a mat.

A system, process, and method of recycling post consumer paperboard food service items, comprising the step of drying a cellulose fiber mat using a combination of convective and conductive heat transfer.

A system, process, and method of recycling post consumer paperboard food service items, comprising the step of slitting or cutting a dried cellulose fiber mat into sheets.

A system, process, and method of recycling post consumer paperboard food service items, comprising the steps of stacking, compressing and banding sheets of cellulose into bundles.

A system, process, and method of recycling post consumer paperboard food service items, comprising the step of deriving de-inked pulp similar to southern bleached softwood virgin pulp, which could be used to add to other fiber to make cup stock.

A system, process, and method of recycling post consumer paperboard or plastic based food service items, including the step of removing any foreign objects (e.g. hard objects, metal objects, hard plastic, ceramic, wood) from the waste prior to a step of de-bulking the waste to prevent damage to the de-bulking equipment or device.

A system, process, and method or recycling post consumer paperboard or plastic based food service items, including the steps of draining any waste water or liquid from the waste, and pumping and/or draining the waste water or liquid into a drain.

A system, process, and method of recycling post consumer paperboard into long stock for use in making new paper products, in particular paper cups.

An apparatus comprising or consisting of a smart waste container.

An apparatus comprising or consisting of a waste container and an electronic device.

An apparatus comprising or consisting of a waste container and an electronic tracking device.

An apparatus comprising or consisting of a waste container and an electronic device for communicating with a computer system.

An apparatus comprising or consisting of a first waste container and an electronic device for communicating with a second waste container.

An apparatus comprising or consisting of a waste container and an electronic device for communicating with a disposable waste container.

An apparatus comprising or consisting of a waste container and an electronic tracking device for communicating with a disposable waste container.

An apparatus comprising or consisting of a waste container and an electronic device for communicating with another electronic device or system.

An apparatus comprising or consisting of a waste container and an electronic tracking device for communicating with another electronic device or system.

An apparatus comprising or consisting of a waste container and an electronic device for communicating with an external electronic device.

An apparatus comprising or consisting of a waste container and an electronic device for communicating with an external electronic tracking device.

An apparatus comprising or consisting of a waste container and an electronic device for communicating with an internal electronic device.

An apparatus comprising or consisting of a waste container and an electronic device for communicating with an internal electronic tracking device.

An apparatus comprising or consisting of a waste container and an electronic device for wirelessly communicating with another electronic device or system.

An apparatus comprising or consisting of a waste container and an electronic device for communicating with another electronic device via a telephone system.

An apparatus comprising or consisting of a waste container and an electronic device for communicating with another electronic device via a cellular system.

An apparatus comprising or consisting of a waste container and an electronic device for communicating with another electronic device via the Internet.

An apparatus comprising or consisting of a waste container and an electronic device for communicating with another electronic device via a satellite.

An apparatus comprising or consisting of a waste container and an electronic device for communicating with and/or detecting another waste container.

An apparatus comprising or consisting of a waste container and an electronic tracking device for communicating with another waste container.

An apparatus comprising or consisting of a waste container and an electronic device for communicating with and/or detecting another waste container disposed within the waste container.

An apparatus comprising or consisting of a waste container and an electronic device for communicating with and/or detecting another waste container disposed within the waste container and communicating with another electronic device.

An apparatus comprising or consisting of a waste container and an electronic tracking device for communicating with and/or detecting another waste container disposed within the waste container and communicating with another electronic device.

An apparatus comprising or consisting of a waste container and an electronic tracking device for communicating with and/or detecting another waste container disposed within the waste container and communicating tracking information with another electronic device.

An apparatus comprising or consisting of a waste container and an electronic tracking device for communicating with and/or detecting another waste container disposed within the waste container and communicating tracking information with a remote electronic device.

An apparatus comprising or consisting of a waste container and an electronic device for communicating with and/or detecting an RFID device.

An apparatus comprising or consisting of a waste container and an electronic tracking device for communicating with and/or detecting an RFID device.

An apparatus comprising or consisting of a waste container and an electronic tracking device for communicating with and/or detecting another waste container comprising an RFID device.

An apparatus comprising or consisting of a waste container and an electronic tracking device for communicating with and/or detecting another disposable waste container comprising an RFID device.

An apparatus comprising or consisting of a waste container comprising an identification device and another waste container comprising an identification device.

An apparatus comprising or consisting of a waste container comprising an identification device and another waste container disposed within the waste container, the another waste container comprising an identification device.

An apparatus comprising or consisting of a waste container comprising an identification device; another waste container disposed within the waste container, the another waste container comprising an identification device; and an electronic device for communicating between the identification devices of the waste container and the another waste container.

An apparatus comprising or consisting of a waste container comprising an identification device; another waste container disposed within the waste container, the another waste container comprising an identification device; and an electronic device for communicating between the identification devices of the waste container and the another waste container and a remote electronic device.

An apparatus comprising or consisting of a waste container comprising an identification device; another waste container disposed within the waste container, the another waste container comprising an identification device; and an electronic device for communicating between the identification devices of the waste container and the another waste container and a remote electronic tracking device.

An apparatus comprising or consisting of a waste container and an electronic device for communicating with and/or detecting a barcode device located on another waste container.

An apparatus comprising or consisting of a waste container and an electronic device for communicating with and/or detecting a barcode device located on another waste container disposed within the waste container.

An apparatus comprising or consisting of a waste container and an electronic device for communicating with and/or detecting a barcode device located on a disposable waste container.

An apparatus comprising or consisting of a waste container and an electronic device for communicating with and/or detecting a barcode located on a disposable waste container disposed within the waste container.

An apparatus comprising or consisting of a waste container and an electronic tracking device for communicating with and/or detecting a barcode located on a disposable waste container disposed within the waste container.

An apparatus comprising or consisting of a waste container and an electronic tracking device for communicating with and/or detecting another waste container comprising an RFID device.

An apparatus comprising or consisting of a waste container and an electronic tracking device for communicating with and/or detecting a disposable waste container comprising an RFID device.

A system comprising or consisting of waste container for electronically communicating or signaling to an electronic device and/or system.

A system comprising or consisting of waste container for electronically communicating or signaling to an electronic tracking device and/or system.

A system comprising or consisting of waste container for electronically communicating or signaling to a remote electronic device and/or system.

A system comprising or consisting of an electronic waste container for electronically communicating or signaling to an electronic device and/or system.

A system comprising or consisting of an electronic waste container for electronically communicating or signaling to an electronic tracking device and/or system.

A system comprising or consisting of an electronic waste container for electronically communicating or signaling to a remote electronic device and/or system.

A system comprising or consisting of an electronic waste container for electronically communicating or signaling to another waste container.

A system comprising or consisting of an electronic waste container for electronically communicating or signaling to a waste container disposed within or to be disposed within the electronic waste container.

A system comprising or consisting of an electronic waste container for electronically communicating or signaling to a waste container disposed within or to be disposed within the electronic waste container and communicating with another electronic device or system.

A system comprising or consisting of an electronic waste container for electronically communicating or signaling to a waste container disposed within or to be disposed within the electronic waste container and communicating with a remote electronic device or system.

A system comprising or consisting of an electronic waste container for wirelessly communicating or signaling to a waste container disposed within or to be disposed within the electronic waste container and communicating with a remote electronic device or system.

A method comprising or consisting of communicating or signaling information between an electronic waste container to another waste container.

A method comprising or consisting of communicating or signaling information between an electronic waste container to another waste container disposed or to be disposed within the electronic waste container.

A method comprising or consisting of communicating or signaling information between an electronic waste container and another device and/or system.

A method comprising or consisting of communicating or signaling information between an electronic waste container to another waste container and communicating or signaling between the electronic waste container and another device and/or system.

A system, process, and method for recycling waste, in particular targeted waste. Further, a system, process, and method for recycling waste, comprising the step(s) of marking and/or tagging a waste container. The waste container can be a recyclable waste container, a disposable waste container, a reusable waste container, or any other type of waste container or containers used from the point of collection of the waste (e.g. waste receptacle, waste collection device, waste collection device according to the present invention) to another location such as a point of recycling of the waste (e.g. waste recycling plant).

A waste recycling system, and method for collecting and transporting waste in recyclable or disposable waste containers such as plastic bags, plastic liners, plastic boxes, composite bags, composite paper bags, composite plastic bags, composite plastic/paper bags, non-composite paper bags, cardboard boxes, and other suitable containers that can be used to collect waste, in particular targeted waste, and be marked and/or tagged.

The marking and/or tagging of the waste containers allow the waste containers to be identified and sorted from other waste or waste containers. Further, marking and/or tagging allows for maintaining the chain of custody from the point of collection to the point of recycling.

A waste recycling system and process for recycling targeted waste. The targeted waste is a particular type of waste selected to be collected and recycled such as a particular waste item and/or similar type of waste material. For example, used paper cups are targeted waste to be recycled into new food board stock material, which can then be made into new paper cups having a certain percentage of recycled material content. The targeted waste is collected and/or sorted so as to be the same material for facilitating the recycling process to make recycled stock materials. As another example, plastic beverage containers made of the same plastic material (e.g. polyethylene, PET) are targeted waste to be collected, and then recycled. The targeted plastic waste can be collected in marked and/or tagged disposable plastic bags, shipped with other waste from the store to a waste processing location, and then sorted and collected to be shipped to a recycling location.

Targeted waste is collected in recycling waste receptacles (e.g. garbage can, trash can, waste receptacle, garbage receptacle, trash receptacle, box, waste container, waste collection device, waste collection device). Specifically, marked and/or tagged waste receptacles (i.e. marked and/or tagged for the particular waste item or waste material) for collecting only the targeted waste(s) are set up in the store so that consumers (e.g. customers, employees of the store) selectively dispose of the targeted waste(s) into the marked waste receptacles. For example, a recycling waste receptacle having a sign for "USED PAPER CUPS ONLY" is printed or displayed on the waste receptacle to indicate to consumers to only place "used paper cups only" into this particular marked receptacle. In a preferred embodiment, the marked receptacle is fitted with a removable plastic bag or liner to contain and remove the targeted waste from the marked waste receptacle when filled or being emptied, for example, at closing of the store at the end of the day or periodically.

The bulk of the collected waste material can be reduced or debulked. The bulk of the collected waste material, preferably targeted waste material, can be reduced, for example, by flattening and/or puncturing. In addition, or alternatively, the waste material can be reduced by cutting, shredding, tearing, penetrating, perforating, rolling, compressing, mechanically compromising, chemically compromising, electrically compromising, and/or otherwise disassembling the waste item.

The waste can be de-bulked on-site, for example, at the store location to provide a higher bulk density for containment and shipping. For example, a waste collection device to be located in a store can be fitted with a shredder for de-bulking the waste material. The waste collection device can be located in the customer area (i.e. front of the store) so that the consumer dispose of the targeted waste (e.g. used paper cups, plastic bottles) directly into the waste collection device, for example, fitted with a removable plastic bag or liner (e.g. preferably a recyclable or disposable plastic bag or liner). Alternatively, the waste collection device is located in a non-customer accessed area of the store (i.e. back of the store), and employees periodically dispose of targeted waste from waste receptacle(s) into the shredder, which shreds the used items collects such into in plastic bags or liners readied for storage and eventual transportation from the store.

The plastic bags or other waste containers utilized in the system, process, and method according to the present invention are provided with at least one tag, preferably an electronic tag such as an RF tag (e.g. RFID, UHFID), or similar wireless electronic tag to electronically tag a first waste container (e.g. plastic bags). Alternatively, or in addition, the bags may be colored marked, marked with a bar code or marked with other distinctive marking to identify the bag and/or the waste contents of the bag. For example, each RF device or bar code can be used to identify a particular bag, or identify the type of waste in a particular bag or other waste container. Preferably, each bag is uniquely tagged with a code to later identify that particular bag.

The RF tags can be associated with the disposable plastic bags, liners or other waste containers in a variety of ways. For example, the at least one RF tag is loosely placed inside each plastic bag or other container (e.g. by the manufacturer of the plastic bags, employee located at the store), or secured or attached to the plastic bag or other container by heat bonding, adhesive, pocketing, closure, plastic tie and/or mechanically to the outside and/or inside of the plastic bag, liner, or other waste container. Preferably, the at least one RF tag is located inside the tagged plastic bags, liners, or other waste containers in an effort to maintain the RF tag or tags within the particular plastic bag or other waste container throughout use of the plastic bags or other containers to avoid loss or separation thereof from the plastic bags, liners, or other waste containers.

Multiple RF tags can be associated with each plastic bag or other container to provide redundancy in the event one or more RF tags are damaged or disabled so that the plastic bag, liners, or other waste containers can still be identified, located, and sorted, for example, from a general waste stream reaching a waste processing location or waste collection center. The RF tags are relatively inexpensive, and thus economically allowing for redundancy of the RF tags in the applications of the present invention(s).

The plastic bags, liners, or other waste containers containing the targeted waste can be selectively picked up and collected from multiple stores, however, the costs may be prohibitive with such selective transportation of the targeted waste. A less costly alternative involves collecting the targeted waste as part of the general waste stream collection process or as part of another recycling collection process. For example, it is desirable that the tagged plastic bags, liners, or other waste containers containing the targeted waste are co-mingled along with the other store waste, and then transported together as a general waste steam to a waste processing location or waste collection center. Alternatively, the plastic bags, liners, or other waste containers containing the targeted waste can be co-mingled with recyclables (i.e. with other bulk materials collected for recycling), and sent to a waste processing location or waste collection center.

Electronic detectors for the RF tags can be provided at the waste processing location or waste collection center to locate the electronically tagged plastic bags, liners, or other waste containers containing the targeted waste. For example, the electronic detectors can be located on garbage trucks, unloading docks, sorting fields or areas, conveyors, chutes, or other suitable location or locations at the waste processing location or waste collection center.

The tagged plastic bags, liners, or other waste containers according to the present invention are sorted by manual or automated methods or procedures, and collected together at the waste processing location or waste collection center. These plastic bags, liners, or other waste containers are aggregated (e.g. baled or palletized), and then transported to waste recycling location (e.g. waste recycling plant) for recycling. For example, flattened and punctured cups are transported to a paper mill where they are broken down into their constituent parts, and the fiber is reprocessed into pulp suitable for manufacturing into products with direct food contact.

At this point the resulting pulp can either be sold or made into paper or paperboard. If the pulp is made into food paperboard, one possible application is making paper cups with recycled material content.

A waste collection device. The waste collection device can be a stand alone collection device. The waste collection device can be configured to be a self-contained unit, and collect waste onsite, for example, at a restaurant, retail store, business, office, school, commercial, industrial, government or other locations.

The waste collection device can be configured to treat the waste, in particular treat the waste when being discarded into and/or stored in the waste collection device. In preferred embodiments, the waste collection device can treat the waste by de-bulking (e.g. shredding), disinfecting, identifying the waste, removing water or liquid from the waste to maintain the quality of the stock material of the waste as it is being inserted and/or stored in the waste collection device. In a more preferred embodiment, the waste is treated in multiple steps or multiple processes, again to maintain the quality of the stock material of the waste for recycling purposes.

The waste collection device can include a collection vessel. The collection vessel, for example, can include a collection vessel top portion supported by a collection vessel housing. A processing section, which could contain the debulking mechanism (e.g. shredding mechanism), an unwanted waste rejection mechanism, a disinfecting device, a tagging mechanism, and/or controls to operate the collection device can be located between the collection vessel top portion and the collection vessel housing. The processing section, for example, can be a module, and removed in-tack for repairs or replacement. Alternatively, the processing section can be located inside the collection vessel top portion and/or the collection vessel housing.

The collection vessel housing can be where the waste is stored is vessels such as bags, liners, boxes, or other suitable containers. This storage section allows the water/liquid to drain through to the bottom section, and also contains the identification device and can allow for further disinfecting of the waste material, if needed. The collection vessel housing can be provided with an access door (e.g. front door) for providing access to the inside of the collection vessel housing to remove the waste and service the collection vessel housing.

A collection vessel lower portion is located below the collection vessel housing. In a preferred embodiment, the collection vessel lower portion contains a collection pan, sump pump, drain and/or siphon to collect and eliminate the water or liquid from the waste collection device. This section can contain a super absorbing pad that would collect and water or liquids, which drain or move inside the collection vessel housing. The pad can be easily removed and thrown away with other garbage.

A removable waste collection bag is provided in the collection vessel housing. An upper end of the waste collection bag is maintained opened by the collection vessel top portion and/or collection vessel housing when installed in the collection vessel housing to allow shredded waste to fall via gravity into the collection bag during operation of the waste collection device.

The waste collection bag can be constructed (e.g. perforated) to allow water or liquid to drain from the waste collection bag when installed inside the collection vessel housing. For example, a lower portion of the waste collection bag is provided with an opening(s) and/or drain(s). The collection bag can be a disposable plastic bag having a lower portion perforated with multiple holes (e.g. pattern design or matrix arrangement of drain holes). The liquid or water drains from the waste collection bag as waste is being de-bulked into the waste collection bag, for example, by a shredder mechanism. The liquid or water continues to drain from the shredded waste contained and stored in the waste collection bag with time due to the effects of gravity.

When the waste collection bag is filled, the waste collection bag is removed from the waste collection device. For example, a front door on the collection vessel housing is opened, and then the filled waste collection bag is removed therefrom. In a preferred embodiment, a transport bag is fitted around (i.e. nested outside) the waste collection bag just prior to removal of the waste collection bag from the collection vessel housing. The transport bag is preferably a non-perforated bag configured to contain and seal the filled waste collection bag, and prevent leaking of the waste collection bag during removal from the collection vessel housing and subsequent transport and storage thereof.

The waste collection bag and/or transport bag can be fitted with and RFID tag to carry out the waste recycling processes according to the present invention. Preferably, the RFID tag is provided in the transport bag to avoid contact with any liquid or water. Further, preferably the waste collection bag and/or transport bag are coated or impregnated with a biocide (e.g. liquid, powder, coating), which is activated in the presence of liquid or water or water vapor. Alternatively, biocide can be sprayed or dispersed into or onto the shredded material.

The collection vessel upper portion is preferably provided with an access door through which waste can be inserted. For safety purposes, the access door is preferably an automated door having a proximity sensor to "sense" the presence of a hand as it approaches the opening to open the automated door. The shredder mechanism located below the automated door is provided with an interlock so that the shredder mechanism will not operate when the automated door is open, and will lock the automated door closed during operation of the shredder mechanism. The interlock can also include one or more proximity sensors so that the shredder mechanism will not operate if an individual or user is within a predetermined distance of the waste collection device (e.g. within several feet of the waste collection device). This provides interlock redundancy, and an additional level of safety against injury to the individual or user of the waste collection device.

The access door can be provided with one or more mechanical interlock(s) and/or one or more electronic interlock(s). The top of the container can be configured so that when the access door is opened, there is a false bottom (e.g. sliding or rotating door(s) so that it is impossible to put a user's hand, fingers, or foreign objects (e.g. sticks, metal objects) into the collection vessel shredder blades or mechanism. When the door is closed, the waste falls or slides from the false bottom into the vessel, and the electronic interlock(s) start the shredding mechanism. An arm, brushes, or other mechanism sweeps the area for anything heavier or stiffer than a cup, and removes this into a unwanted waste collection section located behind the processing section. The processing section may include a feeding device for moving and feeding the cups into the shredder mechanism and moving any unwanted waste into the unwanted waste collection section.

A disinfecting device, preferably a UV light emitting diode (LED) mechanism can be located in conjunction within the processing section. The UV LED can provide UV radiation to the waste material either before, during, and/or after the debulking mechanism is operated. For example, the UV light will be turned on as the de-bulking mechanism is turned on and turned off either by a timing mechanism or as the de-bulking mechanism is turned off. A disinfectant spray mechanism and/or a powder distribution mechanism can also be located in this area and operate in conjunction with the de-bulking mechanism. For example, the spray heads are located in the de-bulking section so that all sides of the waste material can be sprayed. The vessels holding the disinfectant spray, for example, can be located in the waste collection section so they can be serviced when the waste bags are being removed.

The waste collection device can be configured to disinfect the waste, in particular disinfect the waste as it is being inserted into the waste collection device and/or when the waste is being stored inside the waste collection device. For example, the waste collection device is provided with a spray device for disbursing a liquid or powdered disinfectant onto the shredded waste. The spray device is preferably located inside the waste collection device, and configured to spray the shredded waste falling out of the shredder mechanism. Alternatively, or in addition, the spray device disburses disinfectant onto the waste sitting in the waste collection bag. For example, the waste stream is sprayed when exiting the shredder mechanism, and again sprayed at a later time when sitting in the waste storage bag. A time sequenced or programmed sequence of spraying can be configured to ensure that the waste is adequately disinfected while sitting in the waste storage bag. In operation, a waste storage bag can be replaced in minutes, hours, or even days depending on the amount of use of the particular waste collection device. Thus, timed or programmed re-treatment of the waste may be necessary to prevent deterioration of the waste stock material to allow later recycling thereof.

Disinfecting of the waste can also be accomplished by using ultra violet (UV) light, micro-waving, refrigeration, freezing and/or irradiation, for example, from mechanical/electronic devices located inside the waste collection device. This disinfecting preferably occurs inside the waste collection device while the waste is being processed and/or stored, however, it can also occur upstream or downstream relative to the waste collection device.

The waste collection device can be configured to collect the liquid or water draining from the waste collection bag contained in the collection vessel housing. The collection container can be configured to collect the liquid or water draining form the waste collection bag (e.g. removable containment vessel, flexible collection bag, collection tray or container positioned inside the collection vessel housing and positioned beneath the draining waste collection bag). In another embodiment, a collection pan having a sump pump is positioned inside the collection vessel housing beneath the draining waste collection bag. The sump pump is provided with a pan level sensor so that the sump pump is operated when the pan is filled. The sump pump can pump the waste liquid or water to a collection container located inside or outside the waste collection device, or via a conduit or pipe can pump the waste liquid or water to a remove location (e.g. floor drain located remote from waste collection device, sewer). In a further embodiment, a sump is provided in the collection vessel, and contains a pad having absorbent material (e.g. desiccant) or other absorbent material and/or device to collect and turn the liquid into a more solid matter. The size of the pad and amount of absorbent material used in the pad is calculated by the pad manufacturer based on the expected amount of liquids estimated or expected to be received by the system. In addition, a sponge can be used in combination in the event the amount of liquids is underestimated, and then disposed of when the sump is being cleaned.

The collection vessel of the waste collection device can be configured to be mobile. For example, a set of swivel wheels can be fitted to the bottom of the collection vessel.

In use, for example, the waste collection device can be co-located with a traditional refuse or waste container. As the customer approaches, he or she discards and cover, straw, stir stick, sleeve, etc. in the waste container. As the customer's hand approaches the collection vessel, the powered automated door opens and the customer drops the recyclable product or waste into the opening. When the customer has retreated a distance of 2 to 4 feet from the collection vessel, the automated door closes, and sensors in the collection vessel head sense the presence of a cup and proceed to initiate the shredding process and mechanism to remove unwanted waste. This process begins by locking the powered automated door closed, and is interlocked electronically and mechanically. Once the interlocks have been proven, the shredder mechanism activates feeding the cup through the shredder mechanism producing preferably a cross-cut waste material. As the waste material is exiting the shredder, the UV LED mechanism is operated, and a fine mist of water based or dry disinfectant/biocide is sprayed onto the waste material, and the waste material then drops into the collection bag.

Once the waste material is in the collection bag, the waste liquid or water drains by gravity through the bag's perforated holes, and into the drainage sump. When the collection bag is full as signaled by an indicator (e.g. light, sound, or other warning), the attendant places the transport bag around the waste collection bag, and removes the combined bags from the collection vessel for disposal thereof. As this happens, the RFID indicator is triggered by the identification mechanism, and the material begins its identification process.

System

The waste tracking and/or recycling system can include marking and/or tagging waste, preferably targeted waste. The waste can be marked and/or tagged from the point of collection to the point of recycling.

The waste is marked and/or tagged at the point of collection such as at a waste container, trash container, waste collection device, or waste collection device according to the present invention. In a preferred embodiment of the waste recycling system according to the present invention, the waste itself, plastic bag, plastic liner, or other waste container is tagged immediately upon waste being disposed of by the consumer.

In a preferred embodiment of the waste collection device according to the present invention, the waste collection device includes one or more electronic tag detectors that immediately detect the electronic tag associated with the plastic bag, liner, or other waste container disposed within the waste collection device (e.g. another waste container for the plastic bag). The electronic tag detector identifies each RF tag and its code, and sends this information to an electronic waste identification, tracking, and monitoring device, preferably contained within the waste collection device (e.g. another waste container for the plastic bag).

The waste collection device preferably also includes a weighing apparatus for weighing the targeted waste being filled into the plastic bag, liner, or other waste container of the waste collection device. In addition, the waste collection device can include sensors (e.g. temperature, pressure, humidity, collection tank fluid level, sprayer liquid level(s), bag fill level, equipment condition detectors, smell detectors, material detectors, equipment maintenance detectors, operational detectors) and alarms (e.g. fire detector, vapor detector, tamper detector, safety detector(s)) for monitoring the specifications, operation, and production of the waste collection device.

The electronic tag detector(s), weighing apparatus, and sensors are electronically linked (e.g. wire or wireless) to communicate with the electronic waste identification, tracking, and monitoring device. In this manner, the waste collection device communicates discrete or real time data concerning tracking the targeted waste (e.g. dates, times, quantities), the number of electronic tag(s) detected, the times electronic tag(s) are detected (e.g. start, finish), the identification of the electronic tags detected, type of waste material, fill level of targeted waste material in plastic bag or liner, fluid levels of equipment, operational conditions (e.g. temperature, pressure, vapor, water or liquid levels in collection tray), warnings, alerts. The electronic waste identification, tracking, and monitor device is electronically linked (e.g. wire or wireless) to a store computer system and/or remote central computer system. Preferably, the waste collection device the electronic communicates (e.g. via the electronic waste identification, tracking, and monitoring device) with the store computer system and central computer system, so that the waste collection device can collect data, and be monitored 24 hours, 7 days per week. In some applications, some selected aspects or all aspects of the waste collection device (e.g. operations, maintenance levels, alarms, alerts, safety, tag information) can be remotely controlled by the store computer system and/or remote central computer system by one or more operators and/or via computer programmed control.

The electronic identification, tracking, and monitoring device begins the process of identifying plastic bags, liners, or other waste containers disposed within the waste collection device, which defines the entry point of waste collection. The store can include additional electronic tag detectors at various locations (e.g. waste storage room, waste removal exit) to track the progress of filled plastic bags, liners, or other waste containers moving about within, or exiting the store. Further, the outside waste receptacles, cans, dumpsters, or outside waste pickup station(s) can be fitted with electronic tag detectors to track progress to these locations.

The waste recycling production and tracking information from the above described waste tracking system can be used for real time monitoring of the waste flow, identify location of tagged waste anytime, forecasting future waste production levels and volumes, waste pick up scheduling (e.g. trucking), and maintaining continuous custody and ownership of the targeted waste material. For example, ownership, control, and/or responsibility of the waste from the store to the hauler or network can begin upon a plastic bag, liner, or other waste container being removed from the waste collection devices in one store, chain of stores, town, village, city, region, state, and country. This information, for example, can be used for financial accounting purposes to set forth sales information (e.g. prices, volume, time of sale, place of sale, purchaser, delivery timing and dates) identification of haulers, bidders, bids, schedule of payments to stores, hauler, recyclers, and system.

The waste collection device can utilize or develop transportations systems and platforms similar to UBER, LYFT, or similar GPS systems to notify waste purveyors when waste is ready to be picked up. The parameters of this system for waste collection can be developed and designed to efficiently pickup and transport waste. The system and platform can include the pickup, transportation, and tracking of the targeted waste.

The waste collection device can send a signal to provide the GPS location of the waste (e.g. street (NYC), waste bins, waste storage rooms) and other information contained in the system such as weight, contents of load, and any other information that a purveyor may need and/or has been collected by the system. The pickup signal can be communicated and received by the nearest purveyor, for example, can be transportation system partners having appropriate electronic equipment configured to receive the pickup signal.

The waste collection device can receive a signal from the waste purveyor when the waste is being picked up. For example, the signal can provide the driver's name, vehicle ID, and other information required as part of the transportation systems platform.

The waste purveyor can send a signal to the nearest collection facility when the vehicle is full. The collection facility can receive the signal, which will include the purveyor's information and information from the waste collection device about the targeted waste including weight and type of targeted waste being transported. Upon waste collection facility acceptance of the load, it will provide GPS location/zone to the waste purveyor where to unload waste.

The waste collection facility can utilize the same system to notify transportation purveyors, which can be transportation system partners when bundled loads are ready to be picked up and sent to a processing facility. The processing facility can utilize the same system to notify transportation purveyors when it has something to ship to other locations.

The transportation system can include selected communications such as RFID information collected by the waste collection device. The material using GPS tracking can be followed by the main computer system so that waste will not be stolen or lost in the transportation cycles. It will also provide information to perform resource and space planning from the waste collection device to the collection facility, the processing facility, and the final customer of the recycled materials.

The waste collection device according to the present invention can include the feature of providing an incentive or reward for a consumer disposing waste into the waste collection device. The waste collection device can vend coupons (e.g. free food, discounted food), prizes, chips, money, toys, gifts, or other items of value to the consumer. Alternatively, the waste collection device can have a light show, music, verbal entertainment, internet links connecting consumers to prize sites, or other activities of value to the consumer.

Processes and Methods

The present invention is directed to an improved waste recycling and/or tracking process and method.

A preferred embodiment of the improved waste recycling process and method according to the present invention comprises the step of tagging, preferably electronic tagging plastic bags, liners, or other waste containers for containing waste, preferably targeted waste. The tagging step allows the plastic bags, liners, or other waste containers to be identified, for example, for later separating or sorting from the other waste. Tagging the plastic bags, liners, or other waste containers allows maintaining a chain of custody of the targeted waste to provide effective recycling of the targeted waste.

The targeted waste itself can be tagged, preferably electronically tagged. For example, the targeted waste can be identified by placing a tag, preferably an electronic tag amid the waste material itself. For example, a tag is added to the targeted waste being filled in a plastic bag, liner, or other waste container. Bulk targeted waste stored or transported in large containers, dumpsters, trucks, piles, storage bins, or other bulk storage devices can be tagged by placing one or more tags, preferably electronic tags, within the bulk targeted waste material itself to identify the type of targeted waste material and provide a chain of custody of the bulk targeted material.

Other preferred embodiments of the improved waste recycling process and method according to the present invention, comprises the step of initially sorting the targeted waste upon being disposed of by the consumer. It is preferably to sort or separate the waste immediately after use by consumers so that the consumers conduct the sorting or separating step, and to prevent contamination of the targeted waste. For example, a plurality of marked waste collection bins (e.g. positioned side-by-side) are provided in stores so that the consumers place a particular type of targeted waste into a particularly marked waste collection bin. It is preferably that only a single type of targeted waste (e.g. waste made of one type of material, fiber, foam, or plastic that is capable of being recycled as a batch) is sorted or separated into a single waste collection bin.

More preferred embodiments of the improved waste recycling process and method according to the present invention, comprise the steps of tagging plastic bags, liners, or other waste containers for targeted waste, and sorting or separating targeted waste into the plastic bags, liners, or other waste containers. The tagging step can be conducted before, simultaneously, or after the sorting or separating step. For example, plastic bags or liners are provided with electronic tags during manufacturing of the plastic bags or liners (i.e.

before sorting or separating step), or plastic bags or liners filled with targeted waste can be fitted with closures provided with electronic tags to close same for transporting (i.e. after sorting or separating step).

Again, preferably a single type of waste (e.g. paper cups, paper plates, plastic tableware, plastic containers, plastic bottles, paper products, food waste) are collected into a waste container (e.g. plastic bag, color-code plastic bag, paper bag, paper container, cardboard container). The waste container can be located within a waste receptacle (e.g. garbage container, trash container) to allow the container to function, or be used or operated. When the container is full, the waste container is tagged, preferably with an electronic IF tag, which allows the contents of the container to be identified and tracked.

Again, preferably only one type of waste is collected into a single container to segregate and protect the particular type of waste from contamination from other types of waste, especially food waste. This is particularly important for recycling food grade products controlled by the Food and Drug Administration (FDA) so that the particular food grade product waste is not contaminated to allow recycling thereof.

Alternatively, or in addition, to mark the container, the container can be color-coded (e.g. color coded plastic bags) to allow visual identification of the particular type of waste contained within the container. The color coding and/or tagging allows the container to be separated from other waste or other waste type containers, for example, at a waste processing location or waste collection center.

BRIEF DESCRIPTION OF THE DRAWINGS

FIG. 9 is a perspective view of the lower portion of the collection vessel.

FIG. 10 is a front diagrammatic elevational view of the waste collection bag and transport bag.

FIG. 11 is a diagrammatic bottom view of the waste collection bag showing the perforations.

DETAIL DESCRIPTION

Figure 1:
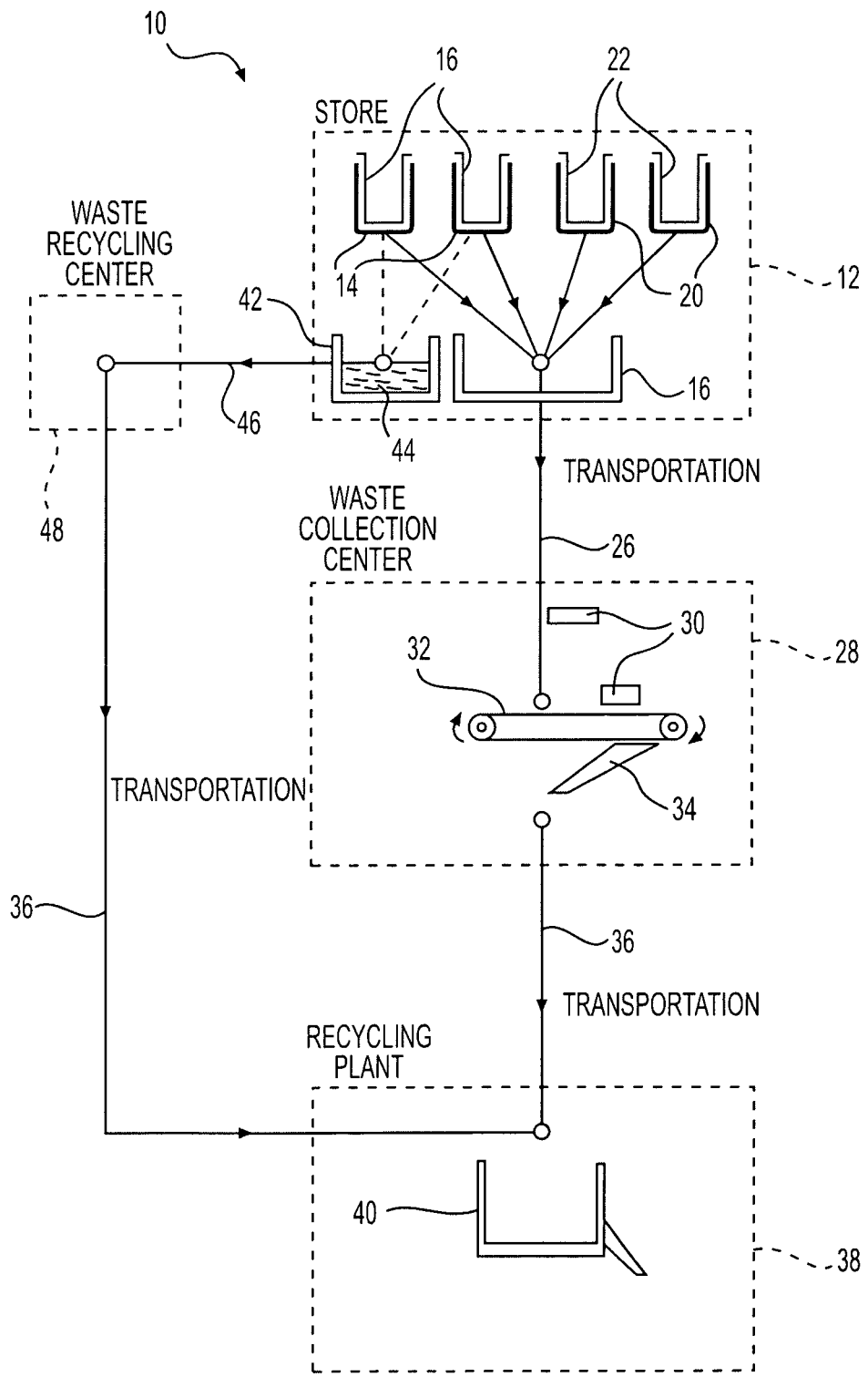
FIG. 1 is a schematic diagram showing the recycling of targeted waste from a store into new products having recycled content.

A schematic diagram of the waste recycling system 10 according to the present invention is shown in FIG. 1.

The waste recycling system begins at a store location 12. Preferably, the store location 12 is just one of a series of stores of similar or dissimilar ownership that have agreed to cooperate with the desired recycling program to obtain the quantity of used waste material required for commercial recycling.

It is important to note that the preferred embodiments described in this section are directed towards particular types or otherwise targeted waste, for example, used paper cups and used plastic beverage containers. However, the system, method, and device according to the present invention can have many applications for recycling different types of waste (e.g. paper plates, foam plates, plastic utensils, paper bags, paper wrappers, foam cups, foam containers), and maintaining separation and custody of the targeted waste from the point of collection to the recycling process or waste processing location to avoid contamination of the targeted waste material.

The initial selective collection of the targeted waste is a preferred initial step to avoid any mixing of the targeted waste with other general waste to avoid any contamination of the targeted waste. Further, providing and maintaining a hygienic environment form start to finish by using new plastic bags or other containers, which are substantially sanitary due to the method of manufacturing, maintains the quality of the targeted waste material through the collection, transportation, sorting or separating, and recycling steps. Typically, the food or beverage contamination of the used containers, for example, paper cups is usually not a factor effecting the final quality and sanitary standards of the recycled pulp or other finished product, since this type of contamination is effectively removed in the recycling process, for example, when making paper stock with recycled content from the waste paper material of the used paper cups. However, bacteria or fungi growth due to the waste food or beverage inside the used paper cups can be a factor if not treated.

In the preferred embodiment, the used paper cups are collected in marked recycling receptacles 14 (e.g. garbage cans, trash cans, garbage receptacles, trash receptacles, cardboard boxes, cardboard containers, paper containers, paper boxes, composite containers, composite boxes, specialized containers). The receptacles 14 are marked so as to identify the particular type or targeted waste to be discarded into the marked waste receptacle 14. For example, the marked recycling receptacle 14 can be marked "USED PAPER CUPS ONLY" by a sign, label, printing, or other suitable display technique or method. Another receptacle can be marked "SPOONS, FORKS AND KNIFES" for plastic and wooden utensils.

As an option or improvement, the marked waste receptacles 14 in the store are paper shredders and/or compactors configured to shred and/or compact the used paper cups. The paper shredder and/or compactor can be located in the front portion of the store allowing customer access, or can be located in a back portion of the store to only allow employee access and operation of the shredder and/or compactor. The paper shredder and/or compactor use plastic bags or liners (e.g. heavier gauge and/or larger plastic bags) including at least one RF tag associated therewith for electronically tagging the plastic bag or liner.

The marked recycling receptacles 14 are located inside the store 12 where customers have access to these marked recycling receptacles 14 so that customers discard their used paper cups or plastic beverage containers into the marked recycling receptacles 14 when finished consuming their beverages. The marked recycling receptacles 14 may each be fitted with a plastic bag 16 having at least one RF tag 18 (FIG. 2) associated therewith.

Alternatively, employees of the store 12 can sort through regular waste receptacles 20 (i.e. unmarked waste receptacles) in the store 12 having standard plastic bags 22 (i.e. having no RF tags), to selectively remove and sort the used paper cups or plastic beverage containers from the other general store waste. The sorted used paper cups or beverage containers are then collected in plastic bags 16 each having at least one RF tag 18 associated therewith. However, this method of sorting the used paper cups or plastic beverage containers from the other general store waste is more labor intensive and expensive. Further, the targeted waste can be contaminated from the other general store waste materials, and is less desirable from initially separating the targeted waste into the marked waste receptacles 14.

The electronically tagged plastic bags 16 are removed from the marked recycling receptacles 14, and then collected with the regular plastic bags 22 containing general store waste from the store 12. Both the tagged plastic bags 16 and regular plastic bags 20 are thrown into a dumpster 24 together to then enter the general waste stream 26. Alternatively, a garbage truck picks up the plastic bags 16, 20 together directly from the store 12. The electronically tagged plastic bags 16 containing the targeted store waste and the regular plastic bags 20 containing the general store waste are co-mingled together in the dumpster 24 or garbage truck, and are transported together as a general waste stream 26 to a waste collection center 28. Alternatively, the electronically tagged plastic bags 16 or other containers are kept segregated from the regular plastic bags 20 containing the general store waste and are co-mingled with other materials (e.g. cardboard) that is currently being recycled by the individual store.

In another embodiment, the receptacle 14 itself is made to be recycled along with the targeted waste contents contained therein to directly serve as a waste "container" according to the present invention. For example, the receptacle 14 can be a paper or cardboard box that is electronically tagged with at least one RF tag associated therewith. Alternatively, the filled receptacle 14 is place in a plastic bag 16 electronically tagged with at least one RF tag associated therewith. The receptacle 14 and targeted waste contents contained therein are discarded into the dumpster 24 or garbage truck as a unit. This particular receptacle 14 may or may not have a plastic bag or liner depending on the particular application. In any event it is desirable that such a receptacle remains intact when co-mingled with the waste stream and then later be sorted out, for example, as a waste collection center.

The waste collection center 28 includes one or more RF sensors 30 for electronically detecting the electronically tagged plastic bags 16 or containers containing the targeted store waste. An RF sensor 30 can be located near or adjacent a location where the dumpsters 24 or garbage trucks unload the general waste steam 26, for example, onto a sorting floor of the waste collection center 28. Unloading and/or sorting equipment such as lifts or trucks can be fitted with RF sensors 30 to locate the electronically tagged plastic bags 16 containing the targeted store waste being moved or sorted on the sorting floor. Alternatively, the general waste steam 26 is loaded onto a sorting conveyor 32 fitted with one or more RF sensors 30 located along the sorting conveyor 32. The sorting conveyor 32 can be fitted with a mechanism to "kick out" the electronically tagged plastic bags 16 from the sorting conveyor 32 onto a chute 34 (or another conveyor) to sort our and collect the electronically tagged plastic bags 16.

The electronically tagged plastic bags 16 containing the targeted store waste are collected (e.g. placed on pallets) for transportation as a targeted waste stream 36 to a recycling plant 38 such as a paper mill, plastic pellet manufacturing plant, or other recycling facility. For recycling paper cups, the targeted store waste is shipped to a paper mill for recycling into new paper stock having recycled material content. Once at the paper mill each individual bag is automatically weighted and a generator's attribution established. The targeted waste quality along with collection and transportation data is recorded and used for quality control purposes.

Alternatively, or in addition, the store 12 can be provided with a separate dumpster 42 for collecting a recyclable waste 44, for example, cardboard waste. The electronically tagged plastic bags 16 can also be collected in the dumpster 42, and co-mingled with the recyclable waste 44. The recyclable waste stream 46 is transported to a waste recycling center 48, at which the electronically tagged plastic bags 16 are sorted from the recyclable waste 44.

The electronically tagged plastic bags 16 can be provided with a single RF tag 18, or preferably multiple RF tags 18 to provide operational redundancy in the event one or more of the RF tags are separated from the plastic bags 16, or damaged. The RF tags 18 are preferably adhesively secured to the inside of the plastic bags 16 during manufacturing of the plastic bags 16. A targeted waste stream 36 is transported from the waste recycling center 48 to the recycling plant 38 for recycling into new products having recycled content.

Figure 2:
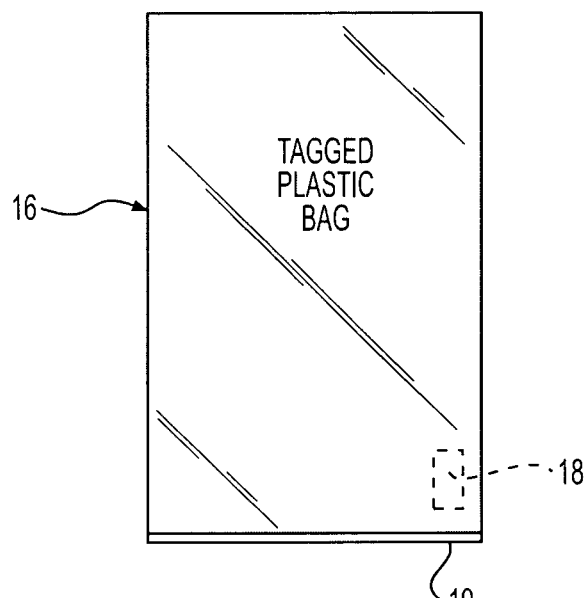
FIG. 2 is a side elevational view of a new unopened electronically tagged plastic bag or other container device according to the present invention having at least one RF tag.
Figure 3:
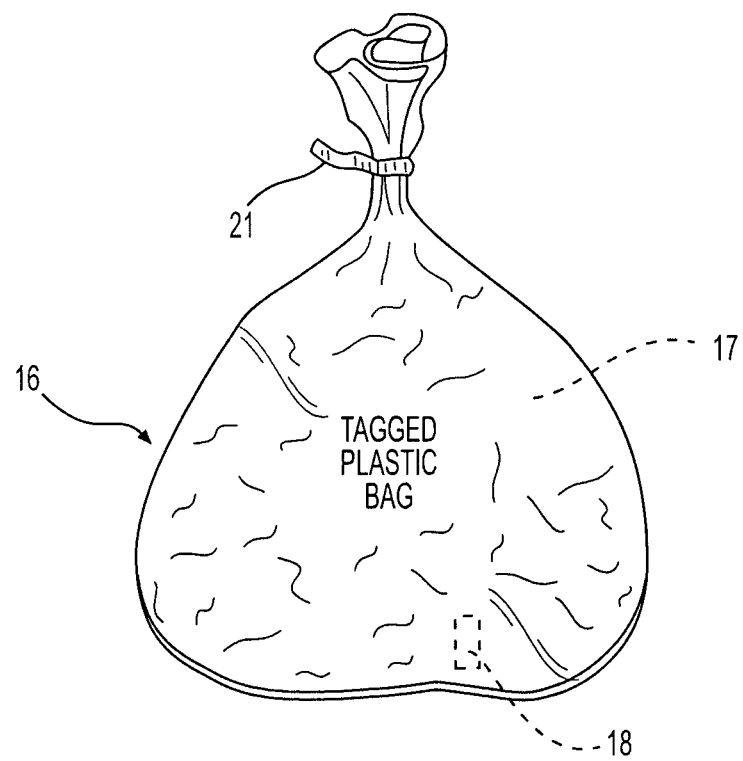
FIG. 3 is a side elevational view of a used filled plastic bag or other containment device according to the present invention having at least one RF tag containing targeted waste readied for transportation to a processing plant.
Figure 4:
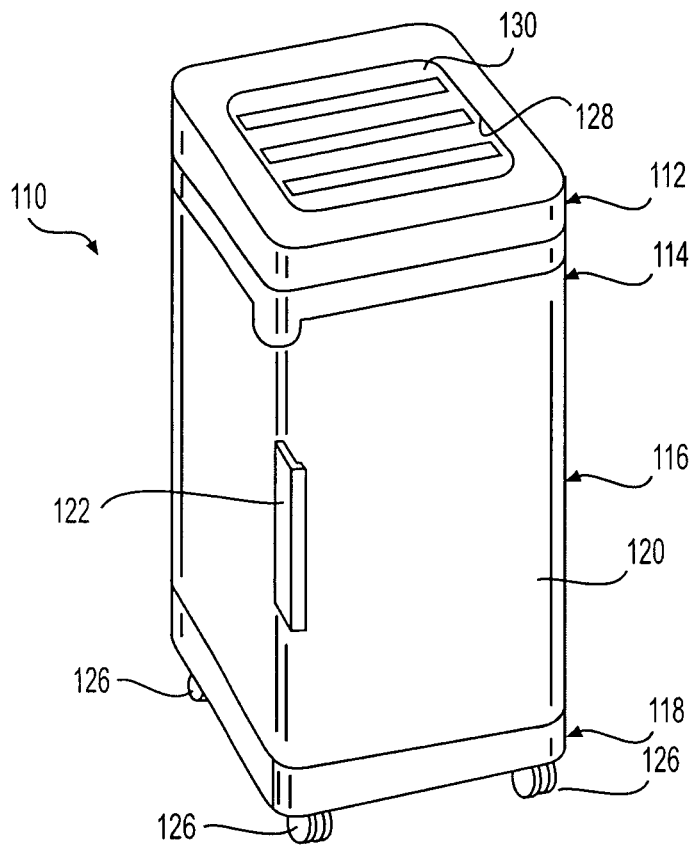
FIG. 4 is a perspective view of a preferred embodiment of the waste collection device according to the present invention showing the automated door in an open position.
Figure 5:
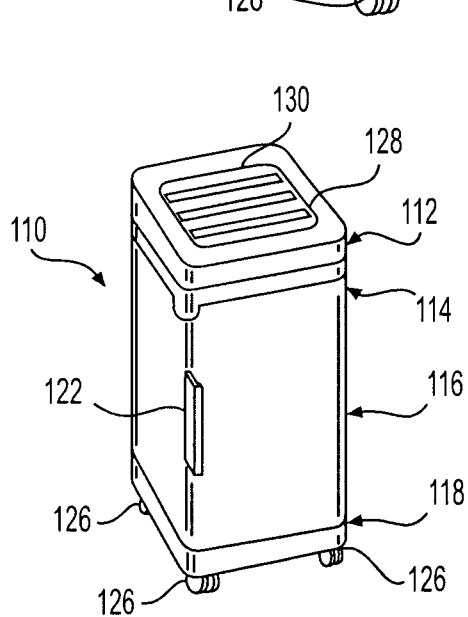
FIG. 5 is a perspective view of the waste collection device shown in FIG. 4, however, with the automated door in a closed position.
Figure 6:
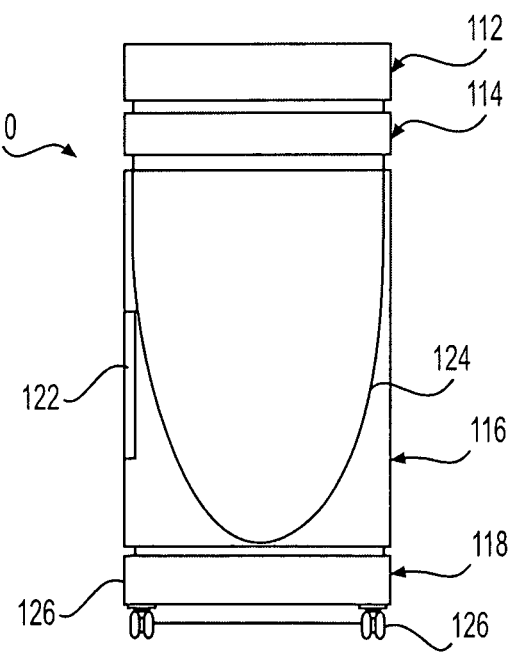
FIG. 6 is a front diagrammatic view of the waste collection device shown in FIG. 4.

The electronically tagged plastic bags 16 according to the present invention are shown in FIGS. 2 and 3.

As shown in FIG. 2, a newly manufactured unopened and unused flat plastic bag 16 is shown. The RF tag 18 is located inside the plastic bag 16 preferably near or at the bottom thereof. A heat welded seam 19 defines the bottom of the plastic bag 16. As shown in FIG. 3, the plastic bag 16 is filled with targeted waste 17 (e.g. shredded paper cups or plastic bottles), however, the RF tag 18 remains adhered and attached to the inside surface of the plastic bag 16 to prevent separation from the plastic bag 16. A plastic tie 21 can be used to close an upper portion of the plastic bag 16, or the upper end of the plastic bag 16 can be tied into a knot to close same.

The waste recycling method according to the present invention includes the step of collecting targeted waste in electronically tagged plastic bags. This method maintains the targeted waste separated from other waste to prevent contamination and maintain custody of the targeted waste.

Preferably, the target waste is collected immediately after use, for example, after a store customer consumes his or her beverage, and then discards the used container. Collecting the targeted waste in marked waste receptacles allows for the targeted waste to be immediately sorted from other waste, and greatly reduces the risk of contamination by other store waste. Optionally, it is desirable to shred, puncture, perforate, cut, drill, machine or otherwise compromise the wall(s) of the beverage containers (e.g. used paper cups) at the store location (e.g. inside waste collection device) to allow the water or liquid to drain from the beverage containers to facilitate the recycling thereof.

Waste Collection Device

A preferred embodiment of a stand alone type waste collection device 110 according to the present invention is shown in FIGS. 4-11.

The waste collection device 110 includes a collection vessel upper portion 112, a collection vessel processing/shredder mechanism 114, a collection vessel housing 116, and a collection vessel lower portion 118. The collection vessel lower portion 118 can be provided with a drawer for collecting and removing water, liquid and/or solids, and to allow cleaning of the drawer.

The collection vessel housing 116 sits on top of and is supported by the collection vessel lower portion 118. The combined collection vessel upper portion 112 and collection vessel shredder mechanism 114 sits on top of, and are supported by the collection vessel housing 116. The sub-units (i.e. collection vessel upper portion 112 and collection vessel lower portion 118) of the waste collection device 110 can be separated sub-assembles connected together (e.g. removably connected together), or can be assembled to become a single assembled unit.

The collection vessel housing 116 is provided with a door 120 having a handle 122 to allow access to the inside of the collection vessel housing 116. A waste collection bag 124 is provided inside the collection vessel housing 116. The waste collection bag 124 is opened at its tops and closed at its bottom, however, a lower portion of the waste collection bag 124 is provided with a plurality of perforations 125 (FIGS. 10 and 11).

The waste collection bag 124 is situated inside the collection vessel housing 116 so that the upper open end thereof is maintained opened to receive shredded waste from the collection vessel shredder mechanism 114 via gravity. For example, the collection vessel upper portion 112 and collection vessel shredder portion 114 can be assembled together and be removable as a sub-unit from the upper end of the collection vessel housing 116. The upper end of the waste collection bag 124 is folded over the upper edge of the collection vessel housing 116 to support and hold open the waste collection bag 124. Alternatively, a frame (e.g. sliding frame or other mechanical support) can be fitted inside the collection vessel housing 116 to support and maintain the upper end of the waste collection bag 124 opened.

The collection vessel lower portion 118 is fitted with four (4) wheels 126 at the bottom corners thereof to render the waste collection device 110 mobile. For example, the wheels 126 are coaster wheels configured to swivel. This allows the waste collection device 10 to be moved around the store, retail, office, school, commercial, institutional and/or government locations.

The upper end of the collection vessel upper portion 112 is provided with an opening 128 having an automated door 130 configured to automatically open and close the opening 128. The waste is thrown into the opening 128 by an individual or user.

Figure 7:
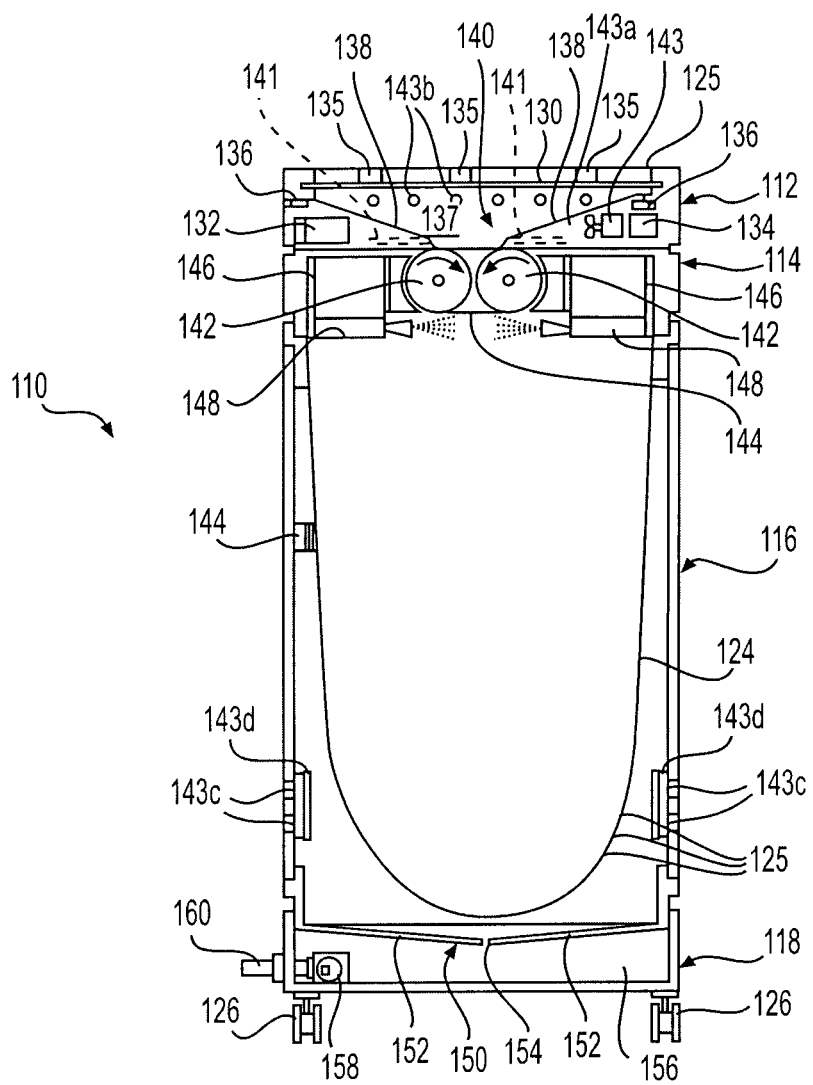
FIG. 7 is a front diagrammatic elevational view of the waste collection device shown in FIG. 4.

A detailed diagrammatic view of the waste collection device 110 is shown in FIG. 7.

The collection vessel upper portion 112 is shown with the opening 128 having an automated door 130. The automated door 130 is driven by an electric motor/drive 132, and controlled by electronic control unit 134 having hand proximity sensors 135 and body proximity sensors 136. The hand proximity sensors 135 are provided around the opening 128 for operating the automated door 130, and body proximity sensors 136 are provided around the front and sides of the waste collection device 110 to sense the body of an individual or user proximate to the front and sides of the waste collection device 110. The body proximity sensors are used in combination with an interlock arrangement (e.g. electronic and/or mechanical) to prevent the collection vessel shredder mechanism 114 to operate when an individual or user is proximate or near the waste collection device 110 (e.g. no shredding operation if individual or user is with 2 to 3 feet of waste collection device 110).

The collection vessel upper portion 112 is configured to collect and direct the waste towards the collection vessel shredder portion 114. For example, the collection vessel upper portion 112 is provided with a collection bin 137 having inner inclined wall portions 138 located under the automated door 130 to direct the waste by gravity to a center trough 140 located above the collection vessel shredder mechanism 114.

Figure 8:
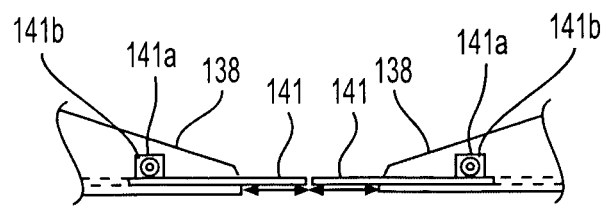
FIG. 8 is a diagrammatic broken away front elevational view of the sliding doors of the collection vessel upper portion.

A pair of sliding doors 141, 141 are positioned above a pair of rotary shredding cutters 142, 142, to provide a false bottom when a user is throwing waste into the collection vessel upper portion 112 through an opened automated door 130. A detailed view of the sliding doors 141, 141 is shown in FIG. 8. A pair of electronic stepping motors 141*a*, 141*a* provided with friction driving wheels 141*b*, 141*b* are controlled by electronic control unit 134, or other separate control unit, to open and close the sliding doors 141, 141. Alternatively, the friction driving wheels 141*b*, 141*b* can be replaced with rotary gears to cooperate with a rack formed into or attached to the sliding doors 141, 141 to drive the sliding doors 141, 141, opened and closed.

Preferably, the sliding doors 141, 141 are programmed to remain closed when the rotary shredding cutters 142, 142 are operating to provide a fail safe against personal injury to the user. For example, when a user approaches the waste collection device 110, the automated door 130 opens while the sliding doors 141, 141 remain closed.

After the user retreats form the waste collection device 110 a predetermined distance, the automated door 130 is closed, and then the rotary shredding cutters 142, 142 are operated, and then the sliding doors 141, 141 are opened to drop the waste located in the collection bin 137 into the operating rotary shredding cutters 142, 142. After the waste passes through the rotary shredding cutters 142, 142, then the operation of the rotary shredding cutters 142, 142 is stopped, and then the sliding doors 141, 141 are closed and readied for the next user to approach the waste collection device 110. It is most preferred that the sliding doors 141, 141 must be closed first before the automated door 130 can then be opened, and that the automated door 130 must be completely closed before the rotary shredding cutters 142, 142 can be operated.

The collection vessel shredder mechanism 114 includes the pair of rotary shredding cutters 142, 142 (e.g. cross-cut rotary shredding cutters) located immediately beneath the center trough 140 of the collection vessel upper portion 112. The rotary shredding cutters 142, 142 are connected to an electronic drive/motor 144. The waste is thrown into the collection bin 137 by the user. The waste the moves downwardly via gravity and the rotating shredding cutters 142, 142, which also draw the waste downwardly by and between the rotary shredding cutters 142, 142.

A fan 143 is provided within the collection vessel upper portion 112. The fan 143 is configured to draw in air from outside the waste collection device 10, and circulate the air within a cavity 143a of the collection vessel upper portion. The pressurized air inside the cavity 143 then vents out vent holes 143b, for example, provided in the walls of the collection bin 37. The pressurized air entering inside the collection bin 37 vents air downwardly, when the automated door 120 is closed, through the shredding cutters 142, 142 down into the collection vessel housing 116. The collection vessel housing 116 is provided with vent holes 143c to vent the pressurized air inside the collection vessel housing outside of the waste collection device 110. The vent holes 143c can be fitted with air filters 143d (e.g. activated charcoal filters, dust filters, filters provided with neutralizer, sanitizer, deodorizer, scent or other chemicals) to clean or purify the air exiting the waste collection device 110. The pressurized air circulated in this manner removes moisture and/or vapors located or trapped inside the waste collection device 110, in particular removes moisture or vapors from the shredding cutters 142, 142, electronics, UV LED, and other components that could be damaged by such moisture or vapors.

The collection vessel shredder mechanism 114 is provided with a pair of reservoirs 146, 146 (e.g. disposable and removable containers) fitted with combined electronic spraying/UV LED devices 148, 148 controlled by electronic control unit 134, or other separate electronic controls. For example, the reservoirs 146, 146 are filled with liquid or powder disinfectant or biocide that is sprayed onto the shredded waste exiting the collection vessel shredder mechanism 114 and entering into the upper opening of the waste collection bag 124. The devices are also fitted with UV LED (ultra violet light emitting devices), preferably arranged in one or more rows or a matrix to ensure irradiation of all sides of the waste exiting the shredding cutters 142, 142. Alternatively, the electronic spraying/UV LED devices 148, 148 can be separate electronic devices.

The shredded waste filling the waste collection bag 124 may include waste water or liquid from used containers (e.g. coffee from coffee cups, beverage from beverage cups, liquid from food). This waste water or liquid moves downward by gravity inside the waste collection bag 124, and drains out of the perforations 125 (FIGS. 7, 10 and 11) in the lower portion of the waste collection bag 124. This waste liquid or water drips down into the collection vessel lower portion 118, as shown in FIGS. 7 and 9.

As shown in FIG. 9, the collection vessel lower portion 118 includes a tray portion 150 having four (4) triangular-shaped inclined wall portions 152 for directing the waste liquid or water to a center through hole 154, which drains into a collection reservoir 156. An electronic sump pump 158 (FIG. 7) is provided in the collection reservoir 156 for pumping the collected waste water or liquid through a pipe or conduit 160 to a remote location (e.g. collection vessel, bag, sewer and/or floor drain). The collection vessel lower portion can be provided with a draw for collecting the waste liquid or water, and for removal thereof.

When the waste collection bag 124 is filled, a sensor 164 (FIG. 7) indicates this condition by a visual display and/or alarm. Then, the combined collection vessel upper portion 112 and collection vessel shredder mechanism 114 are lifted from the top of the collection vessel housing 116. The collection vessel housing 116 is opened, and a non-perforated waste transport bag 162 (FIG. 10) is fitted around the waste collection bag 124 (i.e. the waste collection bag 124 is nested with in waste transport bag 162).

Operation

The waste collection device 110, for example, is provided in the front portion of a store or retail location. A user approaches the waste collection device to dispose of water (e.g. used paper coffee or beverage cups). The automated door 130 opens when the hand proximity sensors 135 sense the user's hand in close proximity to the opening 128 of the collection vessel upper portion 112. The user then drops his or her cup into the collection bin 137 of the collection vessel upper portion 112. The automated door 130 closes when the user removes his or her hand in proximity to the automated door 130.

When the user retreats, for example, two (2) to three (3) feet from the waste collection device 110 out of the range of the body proximity sensors 136, the electronic control unit 134 turns on the collection vessel shredder mechanism 114 to begin shredding operation of the used cup. The used cup is drawn downwardly by gravity and the rotary shredding cutters 142, 142, and then the used cup is shredded into numerous shredded pieces of waste. The shredded waste pieces are sprayed with disinfectant or biocide by the electronic control unit 134 operating the spraying devices 148. The electronic control unit 134 can be programmed to control the operational sequence and dwell time of the automated door 130, the collection vessel shredder mechanism 14, the UV LED, and/or the spraying devices 148.

The shredded waste pieces fall down into the waste collection bag 124. When the waste collection bag 124 is filled, the sensor 164 provides a filled bag signal to the electronic control unit 134, which sends a signal to a light or sound indicator. The waste liquid or water drains from the waste collection bag 1124 into the collection vessel lower portion 118. The waste liquid or water is pumped by the electronic sump pump 158 via the conduit 126 to a floor drain.

Smart Waste Recycling System

A Smart waste recycling system 210 for recycling paperboard based post consumer food and beverage related service articles is shown in FIGS. 12 thru 24.

The waste recycling system 210 consists of three elements:

A) Collection;
B) Transportation; and
C) Remanufacturing.

A. Collection

The collection phase of the waste recycling system 210 begins with the "front of the store" consumer. It includes the equipment and processing steps that are necessary to achieve a raw material suitable for recycling.

The waste recycling system comprises a Smart Collection Vessel 212 or (SCV), as shown in FIG. 1. The smart collection vessel 212 includes the following features:
A) Visual recognition of the materials;
B) Hands free operation;
C) Automated bulk reduction;
D) Sterilization and treatment to reduce bacteria;
E) Liquid/solid separation;
F) Computer based control and monitoring;
G) Wired or wireless connectivity with host computer;
H) Ability to operate without utility connection; and
I) Data collection and logging.

Optionally, the system can include a vacuum system to further reduce bulk and reduce the level of oxygen to prevent bacteria and other organisms to grow.

Figure 12:
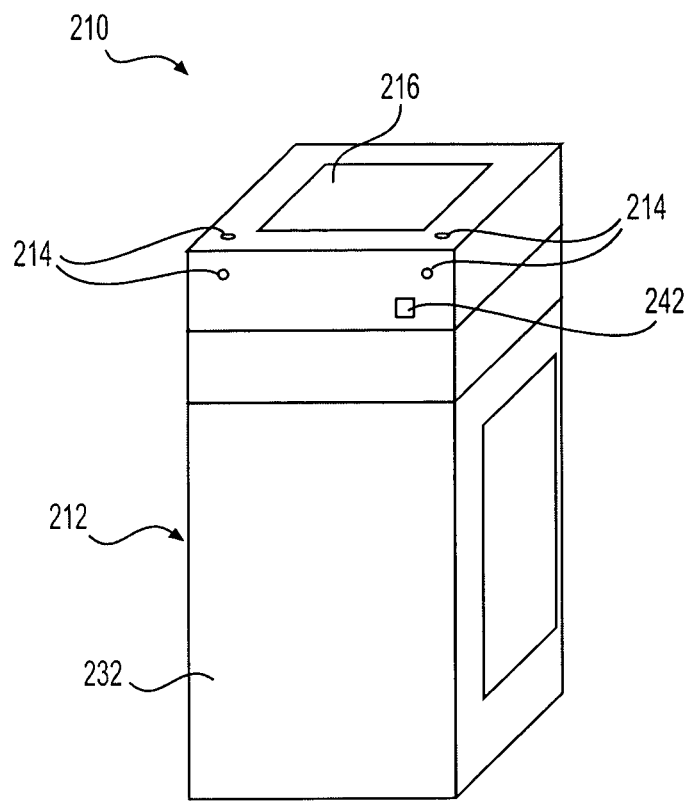
FIG. 12 is a front elevational view of a waste recycling system for use in a front of the store location to collect recyclables from consumers.
Figure 13:
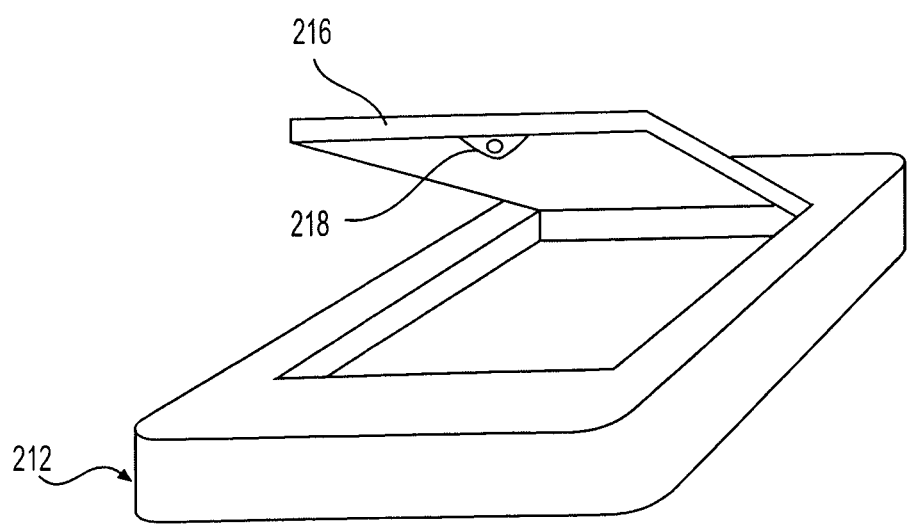
FIG. 13 is a top planar view of the admittance door located on the top of the waste recycling system shown in FIG. 14, showing the inspection cameras and the locking lug.

The Smart Collection Vessel 212, as shown in FIG. 12, provides an interface between the consumer and the recycling process.

As the consumer approaches the Smart Collection Vessel 212 with the user's service items, one or more onboard cameras 214 (e.g. three (3) cameras shown) scan the items in an effort to minimize the inclusion of non-recyclables into the Smart Collection Vessel 212.

If the visual recognition step is satisfied, the Smart Collection Vessel 212 opens a acceptance door 216 where the user deposits the used material(s). The acceptance door 216 is then closed and secured using a mechanical lock 218 (FIG. 13) and electrical interlocks.

Figure 14:
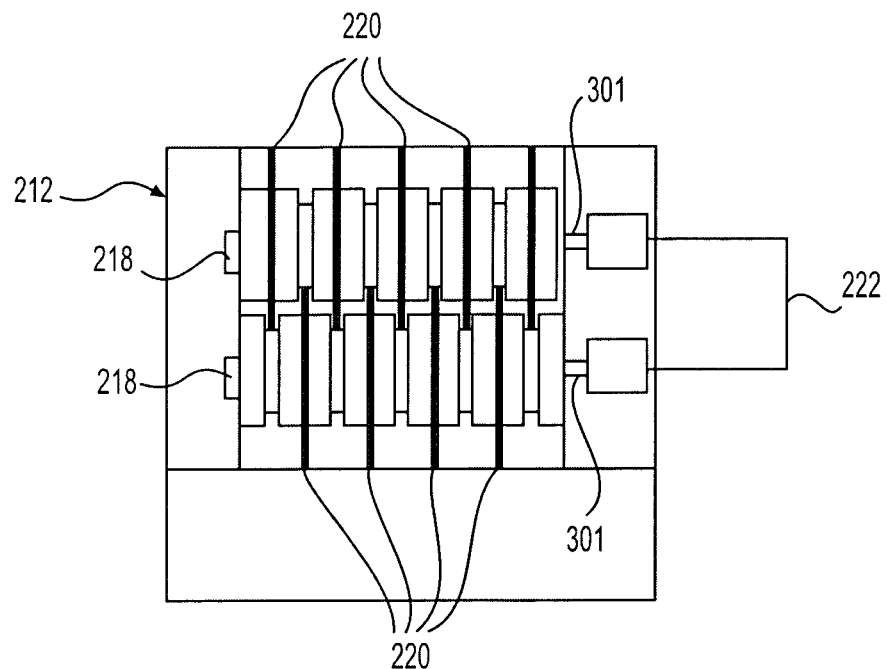
FIG. 14 is a detailed view of the bulk reduction mechanism of the shown in FIG. 14.

The deposited material is then processed to reduce its bulk density and to eliminate entrapment pockets, as shown in FIG. 14. This is accomplished using one or more mechanical methods involving cutting, slitting, perforating and/or crushing, as described below:
A) the bulk reduction mechanism uses two counter rotating shafts 218;
B) each counter rotating shaft 218 is equipped with number of knives 220 (or the counter rotating shafts 218 are driven by a motor 222 or motors (e.g. AC or DC), which is/are coupled to one or both of the counter rotating shafts 218; and
C) the motor can be driven using an on board replaceable rechargeable battery or alternatively the unit can be connected to a conventional power receptacle (100-240 v, AC/DC, 0-70 Hz).

Figure 15:
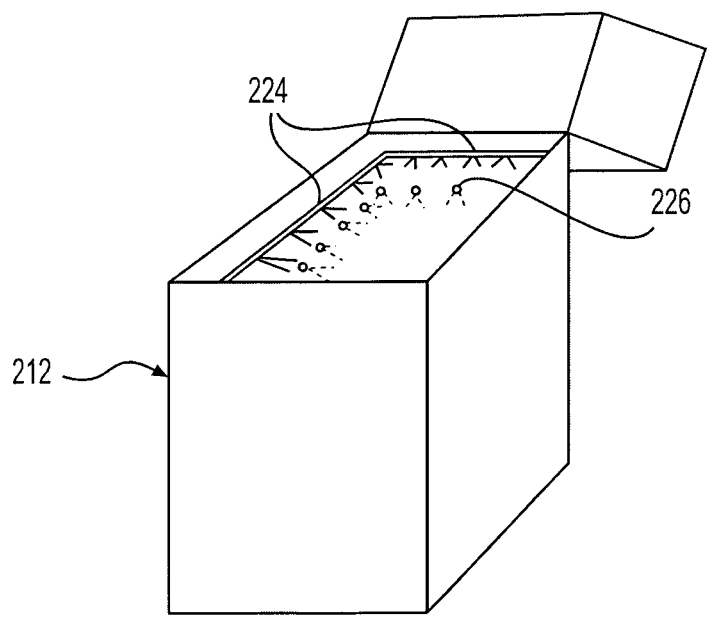
FIG. 15 is a detailed view of the sanitizing section using both UV light and liquid sanitizer of the Smart Container shown in FIG. 14.

The bulk density reduction can be designed to sustain the recyclability of the product by minimizing damage to the underlying fibers. Upon exiting from the bulk reduction step, the product passes through one or several sterilization/disinfection stages, as shown in FIG. 15.

The sterilization/disinfection is accomplished using UV radiation emanating from a florescent or solid state light generation source 224 (e.g. LED).

Figure 16:
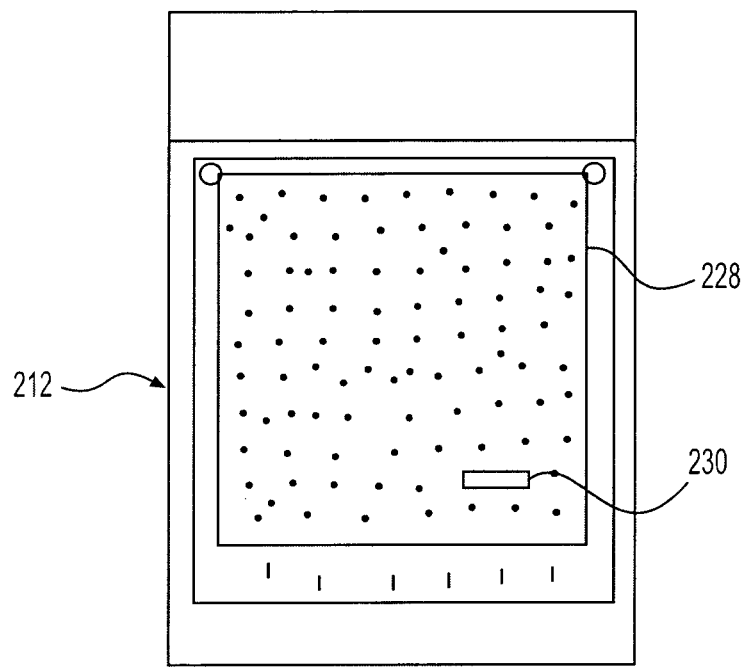
FIG. 16 is a side elevational view of the perforated bag comprising a wireless ID tag of the Smart Container shown in FIG. 14.

Additional disinfection/sterilization can be provided through the spray addition of chemicals or elemental suspensions from jets 226. After sterilization/disinfection, the product drops into a perforated collection bag 228, as shown in FIG. 16. The bag 228 is equipped with an electronic tag 230 containing a unique identifier.

When the bag 228 is installed, the tag 230 is wirelessly queried by the Smart Collection Vessel 212 onboard computer and is logged into the system.

Figure 17:
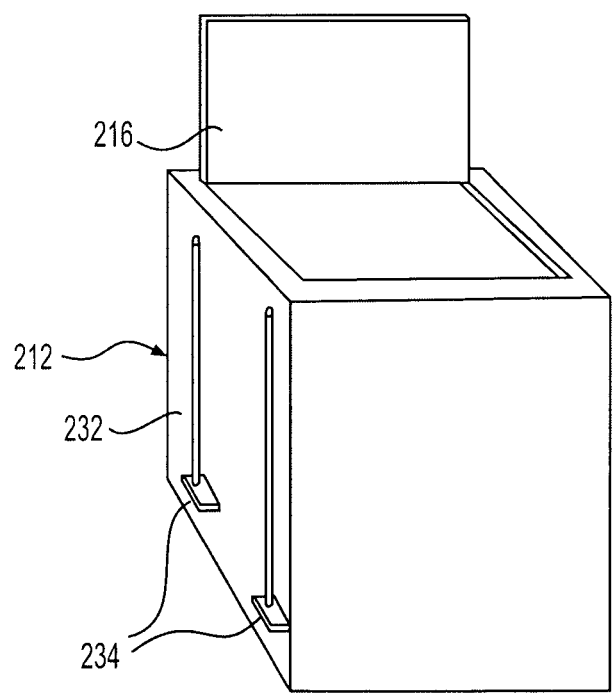
FIG. 17 is a detailed view of the bag holder and load cells of the Smart Container shown in FIG. 14.

The bag holder 232 is equipped with load cells 234, as shown in FIG. 17, that monitor the weight of the collected materials. The load cells 234 transmit information to and associated with the bag's electronic tag.

When the bag 228 is removed from the Smart Collection Vessel 212, it is logged out of the waste recycling system 210, and its attributes are wirelessly transmitted to the host computer for custody and tracking purposes.

Figure 18:
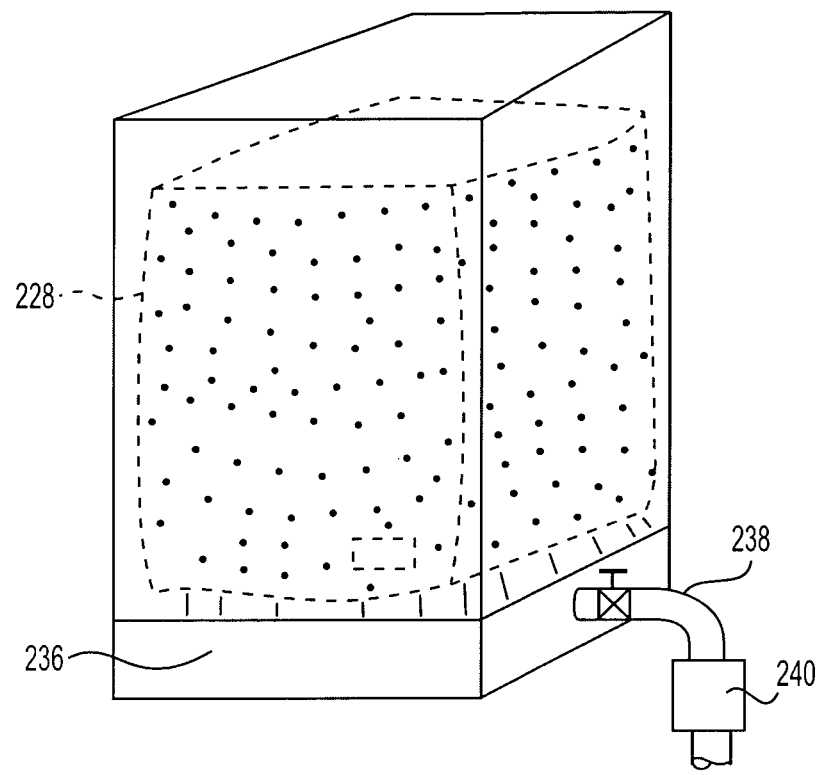
FIG. 18 is a detailed view of the collection sump located in the bottom of the Smart Container shown in FIG. 14.

Any liquids deposited as part of the recovered material, drain from the perforated collection bag 228 into a sump 236, as shown in FIG. 18. The sump 236 is fitted with a traditional gravity drain 238, a transfer pump 240, or alternatively, the liquid can be absorbed into a containment pad for disposal as solid waste.

Figure 19:
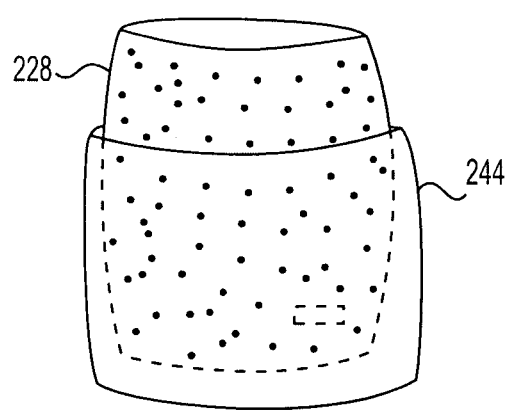
FIG. 19 is a view illustrating the installation of the overwrap bag being installed over the perforated collection bag shown in FIG. 19.

When the collection bag has been filled to capacity, the Smart Collection Vessel 212 illuminates a visual indicator 242 (FIG. 1) for the bag to be changed. The filled bag is removed from the collection vessel and overwrapped with another bag 244, as shown in FIG. 19. The overwrap bag 244 can be sealed using a heat sealing device. Alternatively, the bag can be sealed using adhesive or mechanical means.

Figure 20:
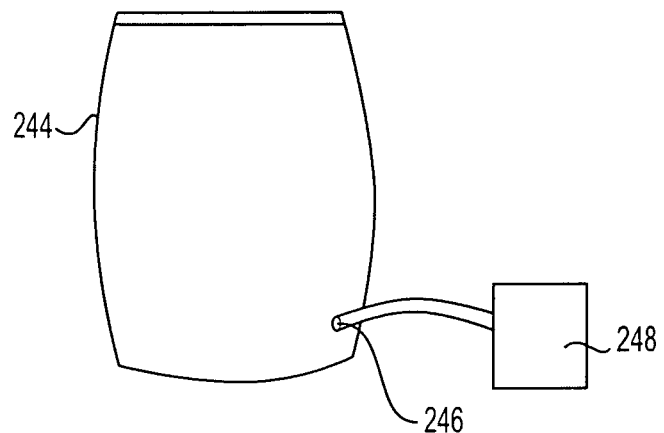
FIG. 20 is a view illustrating the evacuation of air from the sealed overwrap bag shown in FIG. 19.

A one (1) way valve 246 is connected to a vacuum device 248, and the air is evacuated from the bag 244, as shown in FIG. 20. Alternatively, the bag 244 can be simultaneously evacuated and sealed. During the vacuum sealing process, the bag 244 can optionally be purged with an inert gas to displace any residual oxygen. The inert gas can be generated from water soluble capsules in the over bag 244, or alternatively from a tank of compressed gas.

Figure 21:
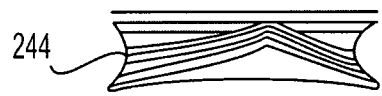
FIG. 21 is a view illustrating the overwrap bag after the air is evacuated.

The evacuated sealed bag 244, as shown in FIG. 21, is deposited in the store's staging area for collection.

B. Transportation

The relatively small volume of post consumer service items suggests that dedicated recovery may not be efficient in most cases. To overcome this issue the waste recycling system 210 can be designed or configured to allow co-transport with other recyclables, or with refuse that is sorted for recoverables before being land filled.

The Smart Collection Vessel 212 accumulates information regarding all recyclable collected on site using wireless technology. Information related to type and volume of recyclable is wirelessly transmitted to a host computer. The host computer relays information regarding type and volume of recyclables to transportation and/or recycling firms. The transportation/recycling firms use the information to arrange for efficient pick up scheduling When the vacuum sealed packets of recyclables arrive at the recycling substation or recovery center, they are separated from other recyclables or co-mingled waste or trash. Separation can be effected using visual recognition and manual selection, or the facility can use automated separation employing the embedded electronic tag as a locator beacon.

The packets are aggregated until there enough quantity to compress into a bale (e.g. 1000 to 2500 lbs), or the packets can be directly loading into containers for transport to the processing facility.

C. Reprocessing

A recycling effort can only be successful if the value of the product(s) exceeds the cost of collection and processing. In this case two co-products, bleached pulp and fuel pellets will be generated.

Figure 22:
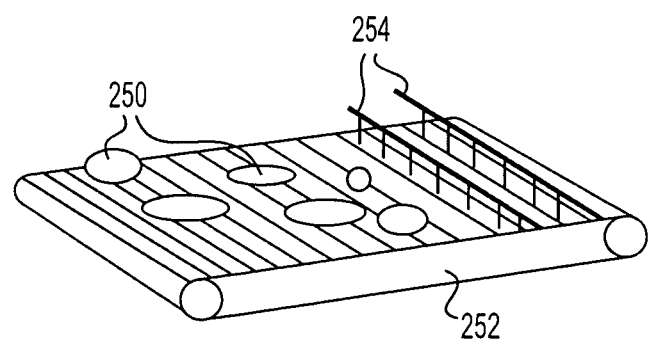
FIG. 22 is a view illustrating the bags shown in FIG. 23 placed on a conveyor for high pressure water slitting.

Upon arrival at the processing facility the bales/containers are opened and the individual packets are placed onto a conveyor in a single layer 250, as shown in FIG. 22. The conveyor 252 passes under a high pressure water jet station 254 where the collection bag 228 and the overwrap bag 244 are cut open. Alternatively, the material can be liberated from the plastic bags using a mechanical bag removal device.

Figure 23:
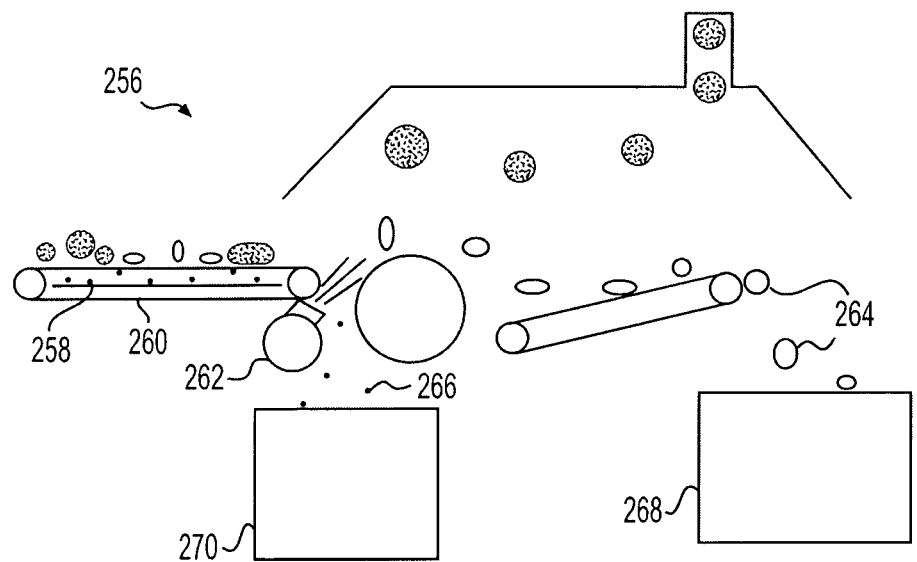
FIG. 23 is a view illustrating the slit bags being processed in the screening/classifying equipment.

At this stage, the material (including the bags 228, 244) is introduced into a screening/classification device 256, as shown in FIG. 23, where materials are automatically sorted based on size and density. Small debris 258 falls through holes in the conveyor 260. Using air from a blower 262, heavy material is segregated from the lighter material. The accepts 264 and rejects 266 are segregated and stored for subsequent processing in respective containers 268, 270.

Figure 24:
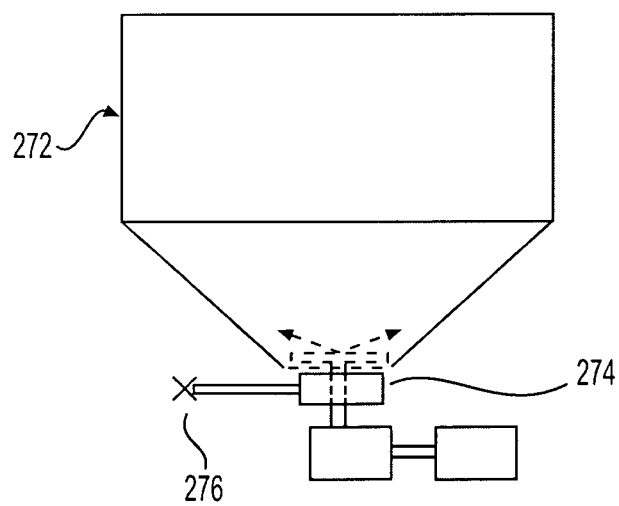
FIG. 24 is a view illustrating the repulper used to process the accepts from the screening/classifying equipment.

The accepts 264 are directed to a pulper 272, as shown in FIG. 24, to begin the process of fiber recovery. The pulper 272 can be bottom rotor/extraction plate arrangement 274, or a drum type. Warm water (110° F.-160° F.) containing surfactants and detergents is introduced into the pulper 272, and a gentle agitation is commenced (washing). After 5-15 minutes, the extraction valve 276 is opened, and the water along with any materials that were dissolved during the washing phase is drained away. The extraction valve 276 is then closed, and hot water (140° F.-200° F.) along with an aqueous solution of caustic (NaOH) in a concentration of 0.05 to 0.5% by weight is added to the pulper 272. Hydrogen Peroxide and surfactants can be added to the pulper, as needed, to maintain brightness and aid in fiber separation.

The mixture is aggressively mixed for 15 to 45 minutes until the fiber have been liberated into a state of colloidal suspension. The extraction valve 276 is opened, and fiber water mix is drained from the pulper 272 leaving behind residual plastics, films and other non-pulpable materials.

The extracted slurry is screened, cleaned, bleached and further processed using conventional technology. The resultant product can be used directly on a paper machine, or it can be formed into sheets on a lap machine and dried, or sold as wet lap pulp for inclusion into white paper products like tissue or communication grade papers. The residuals that remain after the pulping process are combined with the combustibles rejects from the screening/classifying stage, and are processed into fuel pellets using standard technology.

Smart Container

Figure 25:
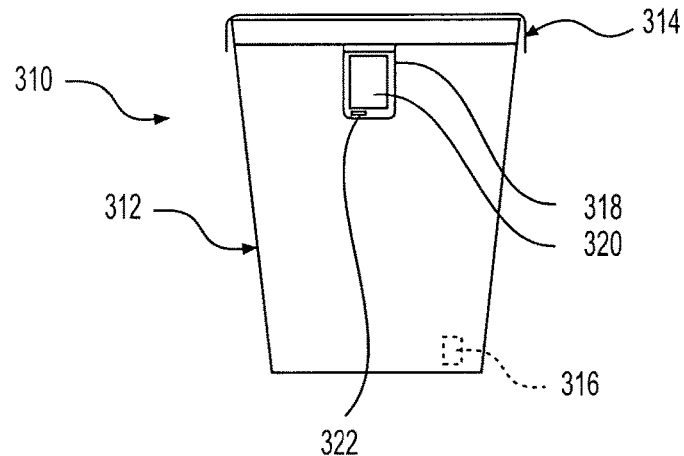
FIG. 25 is a view illustrating a Smart Container according to the present invention.
Figure 26:
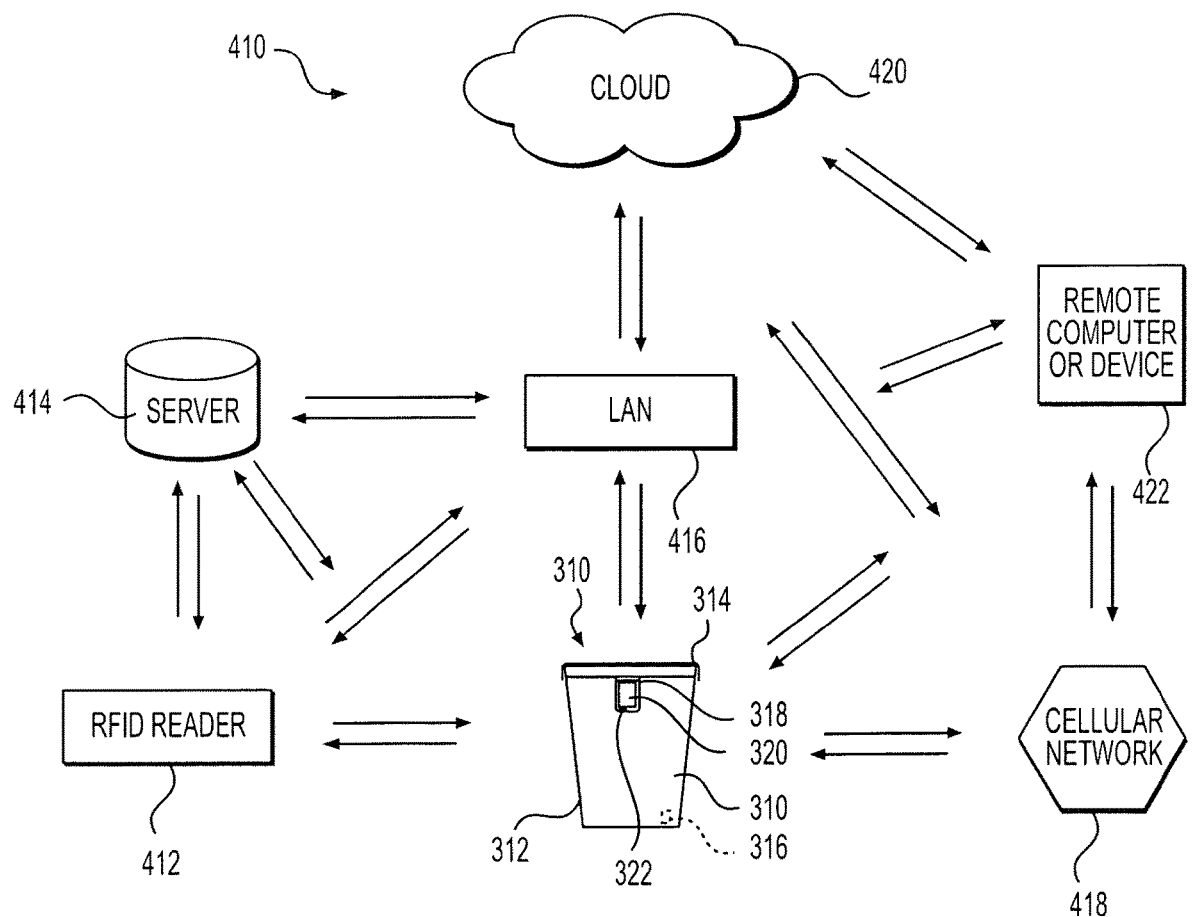
FIG. 26 is a diagrammatic view of the Smart Container system.

A Smart Container 310 is illustrated in FIGS. 25 and 26. The Smart Container 310 comprises an outer container 312 (e.g. first container) and an inner container 314 (e.g. second container). For example, the outer container 312 can be a plastic injection molded container and the inner container can be a disposable plastic bag 314 fitted with a tag 316 (e.g. RFID tag, barcode tag, printed barcode, or combination thereof).

The Smart Container 310 comprises an electronic device 318 for detecting the tag 316 and/or communicating or signaling with the tag 316. The electronic device can be one or more electronic devices incorporated (e.g. molded) into the outer container 312, incorporated into the inner container 314, or can be a separate item (e.g. smart cell phone or like cell phone) connected to, attached or otherwise associated with the outer container 312. For example, the electronic device 318 is molded (e.g. insert molded), fastened and/or attached (e.g. adhered) into or onto the outer container 312 and/or inner container 314.

The electronic device 318, for example, can detect or sense a tag 316. For example, the outer container 312 can be provided with a tag 316 to provide the identity of the outer container and/or the inner container 314 can be provided with a tag 316 to provide the identity of the inner container 314 to a reader or scanner provided in one or more electronic devices 318.

For example, as shown in FIG. 25, the electronic device 318 is associated with the outer container 312 configured to read or scan a tag 316 provided with the inner container 314 (e.g. plastic bag provided with RFID tag). When a new inner container 314 is being fitted into the outer container 312, the electronic device 318 reads or senses the tag 316 provided with the inner container 314, and initializes an electronic link or system between the tag 316 and the electronic device 318. For example, the electronic device 318 once initialized reads or scans information on the tag to identify the inner container 314 (e.g. electronic I.D.), communicates the identity of the tag 316 and associated inner container 314, the identity of the outer container 312, date and time of initialization, store location, client information (e.g. client I.D., contact information, billing information), waste type, date and time when the inner container 314 is partially filled or fully filled, weight when filled, date and time of removal of inner container 314 from outer container 312, logging information, and other information that can be communicated (e.g. by wire and/or a wirelessly via a communication link comprising one or more of a telephone, local area network (LAN), Blue Tooth, cell, computer network, satellite, Internet, GPS, Cloud) to a remote device (e.g. personal computer, server, personal electronic device, cell phone, smart cell phone, iPhone, pad, iPad). Alternatively, the outer container 312 is not fitted with an electronic device; however, an electronic device (e.g. RFID reader or scanner) is installed in the store or store front location (e.g. in or on wall, door frame, wall, ceiling, furniture, floor) to read, scan, communicate and/or signal with the RFID tag 316.

As a further alternative, the electronic device 318 can be the same as or similar to a cell phone for communication or operating on a cellular network. The electronic device 318 can comprise a screen 320 (e.g. touch screen) to view and obtain data similar to a smart phone (e.g. iPhone) and can be provided with a USB port 322 to communicate or signal with an external electronic device (e.g. data input, data collection, programming). In addition, the electronic device 318 can be provided with electronic for cooperating with the Global Positioning System (GPS) for providing location data for the Smart Container 310 to a remote electronic device.

A waste recycling communication network 410 is illustrated in FIG. 26. The Smart Container 310 is located to collect waste or trash (e.g. front of store).

A tag 316 (e.g. RFID tag) associated or applied to the inner container 314 (e.g. plastic bag) is read or scanned by an RFID READER 412 (e.g. located in the front of store). The tag 316 communicates information to the SERVER 414 and/or the LAN 416 (Local Area Network). It is noted that a direct communication link between the tag 316 and the RFID READER 412 can eliminate the need for the electronic device 318; however, the electronic device 318 can provide many additional features and types of communication connections or links.

Alternatively, the electronic device 318 of the Smart Container 310 can be configured to connect or link with the SERVER 414, LAN 416, CELLULAR NETWORK 418, CLOUD 420, and/or REMOTE COMPUTER OR DEVICE 422.

The communication connections or links between the RFID READER 412, SERVER 414, LAN 416, CELLULAR NETWORK 418, CLOUD 420, and/or REMOTE COM- PUTER OR DEVICE 422 are shown as wireless; however, these electronic devices in addition, or alternatively, can be wired together. Further, other types of communication links such as microwave, satellite, Blue tooth, and other type now associated with cellular smart phone can be added, substituted, augmented, or used serially and/or in parallel.

Waste Recycling System, Process, and Method

The waste recycling process and method includes the step of tagging waste, preferably targeted waste. The tagging of the waste itself and/or a plastic bag, liner, or other waste container allows the waste to be identified at anytime. Further, a continuous chain of custody can be established and maintained from a point of collection to a point of recycling to ensure food quality new products having recycled content. In addition, the ownership, control and responsibility of the targeted waste can be continuously monitored, documented, and verified from the point of collection to the point of recycling.

The waste recycling process and method according to the present invention can preferably include a combination of one or more of the following steps: 1) sorting targeted waste by consumers selectively disposing targeted waste in marked waste receptacles, waste collection device, or waste collection device according to the present invention; 2) de-bulking targeted waste to reduce its volume and release any water, liquid, or food from the targeted waste, preferably within the waste collection device according to the present invention; 3) disinfecting the targeted waste to kill and prevent the growth of bacteria, virus, bugs, mold, and fungi, preferably with disinfecting chemicals and/or ultraviolet light and/or irradiating, preferably within the waste collection device according to the present invention; 4) collecting treated targeted waste into plastic bags, liners, or other waste containers, preferably within the waste collection device according to the present invention; 5) tagging the targeted waste, preferably electronically tagging the plastic bags, liners, or other containers, preferably used in the waste collection device according to the present invention.

The step of tagging the targeted waste is very important for identifying the targeted waste, preventing the contamination of the targeted waste, maintaining and ensuring the custody of the targeted waste, and monitoring the ownership, control, and responsibility of the targeted waste from the point of collection to the point of recycling.

Preferably, the targeted waste is tagged immediately upon disposal of the targeted waste, and uninterrupted through the point of recycling of the targeted waste. For example, the targeted waste is collected in plastic bags, liners, or other waste containers (e.g. paper bags, paper boxes, plastic boxes, composite bags, composite boxes, paper containers, plastic containers, shippers) provided with an electronic tag. The plastic bags, liners, or other containers can be disposed of within a waste collection receptacle, preferably a waste collection receptacle having an electronic tag detector for detecting the electronic tag associated with the waste itself or plastic bag, liner, or other waste container. In this manner, the identification of the targeted waste is immediate upon disposal of the targeted waste at the point of collection, for example, by a consumer or employee placing the targeted waste into the waste collection receptacle, preferably the waste collection device according to the present invention.

The waste collection receptacle can include a scale or weighing apparatus (e.g. using strain gages) for determining the weight of the targeted waste contained within a particular plastic bag, liner, or other waste container upon being filled readied for removal from the waste collection device. The electronic tag identifying the particular plastic bag, liner, or other waste container is merged with the weight information to further identify the particular plastic bag, liner, or other waste container for tracking, sorting, bundling, palletizing, accounting, custody, and verification purposes from the point of collection through the point of recycling. The waste collection receptacle can include other detectors for monitoring the status, condition and/or operation thereof. For example, a temperature sensor is used for monitoring the inside temperature or temperature of specific components or parts. Fluid level detectors are used for detecting the level of disinfectant in storage tanks, and the level of water or liquid in the collection bin. Tamper and/or safety warning detectors can be provided to allow remote monitoring and control operation of the waste collection device. One or more video cameras can be provided on or adjacent to the waste collection device to visually monitor the waste collection device.

The waste collection device can be a waste collection receptacle (e.g. Smart Container) configured and/or capable of collecting and communicating information and data about the status and/or operation of the waste collection receptacle, and the waste itself, plastic bag, liner, or other waste container disposed within the waste collection device. This information and data can be communicated by the waste collection device to an in store location and/or remote location (e.g. store computer system, remote central computer system or center). The data is transmitted, collected, stored, monitored, or further processed to provide a system of monitoring, collecting data, and remotely operating the waste collection device. In a preferred embodiment, a plurality of waste collection receptacles in a store are networked within the store, and connected to the centralized remote command and control facility to monitor and control the operation of each waste collection receptacle in every store of a chain of stores, or even a plurality of chains of stores. In this manner, the waste collection receptacles can be remotely monitored and checked in real time to maintain continuous uninterrupted operation, and collect real time information about the identify, weight, type of targeted waste, temperature, humidity, integrity of the plastic bags, liners, or other containers disposed within the waste collection receptacles and operational status and/or conditions of the waste collection device (e.g. power on or off, fill level in collection bag via weight and/or volume dimensions, inside temperature, levels of disinfectant in sprayers, water or liquid level in collection bin, water or liquid leak or stoppage, shredder jammed or good, and safety and tamper issues).

The waste collection device can communicate to store or remote computer systems or centers via wire, cable, fiber optic, telephone, GPS, cell phone transmission, internet, microwave, and/or other available wire or wireless transmission within the store and/or to one or more remote locations (e.g. preferably local and centralized computer center). The waste collection device data network can be combined with other detectors or monitoring equipment within the stores, dumpsters, trucks, waste processing locations, and waste recycling locations to track the targeted waste from the point of collection through the point of recycling. For example, the waste collection data network can be used to supply information to a local waste hauler to indicate the number of filled bags and their identities and weight at each store location for scheduling pickup for operational effectiveness and efficiency. The waste collection computer network can be designed to identify, monitor, and route each and every plastic bag, liner, or other waste container from the waste collection device, movement through the store, collection inside or outside the store, transporting from the store, sorting and movement within a waste processing location or waste collection center, transporting to a recycling location, and movement within the recycling location to the point of recycling (e.g. blender or shredder fill location in the plant). Further, the ownership, control, and responsibility of the targeted waste and accounting information for each step of the waste collection process begins with the waste collection devices in the stores, then the waste haulers, and eventually the waste recyclers so that there can exist real time accounting applications and purposes at each level.

The waste collection devices can also be configured or designed to provide an incentive for the consumer or employees placing the used targeted waste into the waste collection device. For example, the waste collection receptacle can vend a reward or gift (e.g. gift card, product, coupon, points card or receipt, or even money) upon placing the targeted waste into the waste collection device. The waste collection device can be programmed to dispense a reward every time a piece of targeted waste is placed into the waste collection receptacle, or programmed to dispense, for example, a larger reward or gift randomly to provide an incentive to use the waste collection receptacle. For example, the waste collection receptacle can be configured to operate similar to a slot machine (e.g. one arm bandit), however, targeted waste is inserted into the waste collection receptacle to play or operate the waste collection receptacle instead of coins.

Separating Step

A critical step in developing a recycling system is empowering the consumer to separate materials at the time of disposal. Studies have shown that consumers are interested in recycling, but only when presented with the proper stimuli and ease of use. Consumers may still have a problem separating waste because they are either in a hurry, do not know what to do with their waste, or have formed a habit of disposing of their garbage or trash in a central place in one container. It is important that this habit be taken into consideration for the system to work. Container style/design, container locations, consumer safety, signage etc. is critical to achieving consumer involvement.

The waste collection device design should include methods for separating and processing separately all consumer waste generated at the store. The container size, shape and style should be standardized for immediate recognition as a recycling system rather than a garbage or trash container. Marketing/information panels can be provided on the outside of the waste collection receptacles, and these panels should be interchangeable. The waste disposal system should be trademarked to help consumer identify and understand the recycling methods.

The waste collection devices should have openings shaped like the material/items being collected (e.g. paper cups, plates, plastic bottles). It is preferably that the waste collection device be designed to collect one or more types of targeted waste (e.g. one, two, three, or four compartments for different types of targeted waste). The safety locks are preferably installed on the waste collection devices so that when system is operating customer's hands, fingers and other foreign objects will shut down the operation until items these items are removed. The targeted waste material can go into a bin/storage area so that it can be processed when full, or processed as it is received through an opening. Other safety switches can also trigger other processes such as sanitization and/or bulk reduction subsystems.

Bulk Reduction Step

Fast food service items are inherently bulky when collected in an impromptu environment. Efficient collection, storage, sanitizing, liquid removal, transportation and down stream processing of waste material collected requires waste material densification. The waste recycling methods according to the present invention, includes one or more of the steps of cutting, shredding, tearing, pressing, rolling, compressing and/or perforating the waste. These steps or techniques can occur within the waste collection device according to the present invention to efficiently separate solids from liquids, eliminate the potential for trapping contaminants, allowing the material and liquids to be treated with UV and/or other sanitizing liquids or solids, and enhancing the downstream processing of the materials and liquids.

The waste recycling methods according to the present invention preferably include one or more steps of bulk reduction. The bulk reduction of the waste include one or more of the steps of separating, rotating or otherwise changing the direction of the material so that all sides of the material can be sanitized, reducing contaminants, and/or separating liquids effectively from the waste. Again, these steps or techniques can occur in a sub-unit of the waste collection device according to the present invention. The sub-unit can include UV irradiation devices, sanitizing spray mechanisms and/or disinfectant powder dropping mechanisms, preferably located within the sub-unit.

Sanitizing Step

All food service items are contaminated with residual beverage or food items. Failing to address this contamination leads to fungal and bacterial growth, and fosters purification of the material/liquid. It is anticipated the waste material could be stored from one (1) to sixteen (16) weeks in varying weather conditions. Reducing the number of microorganisms up front will reduce waste downstream from the flora and fauna growth. Sanitization of the liquid being separated from the material will also allow the liquid that is collected to be disposed in a safe manner. The sanitization process must be environmentally benign and inherently safe for both the customer and the staff and not impact downstream processing.

The waste recycling method according to the present invention can include the step of irradiating the waste with UV radiation to sanitize both the solids and liquids. The step of irradiating the waste with UV radiation can occur in the waste collection device (e.g. waste processing unit) according to the present invention. For example, this step is provided in the upper sub-unit of the waste collection device.

The UV lamps designed for biocide reduction produce UV light in the range of 200-400 nm in wavelength. The most effective wavelength range for sanitization is 240-275 nm. The UV sterilization mechanism will use specialized LED lights rather than mercury vapor lamps and other UV lamps because of the environmental impact of mercury, the cost of operating (energy usage), the heat generated by other lamps, and the immediate reaction of LED UV lamps.

The UV lamps can be placed before, in conjunction with, and or after other processing sub-systems of the waste collection device according to the present invention. The UV lamps can be made a part of other sub-system so that all surfaces of both the material and liquid can be treated.

In the event the UV irradiation is not sufficiently effective, then LED UV treatment will be combined with a liquid or colloidal anti-bacterial agent to reduce the bacteria/microorganism count. However, the liquid and/or colloidal antibacteria agents can be used by themselves. Safety systems will be set-up with other processes for consumer and store worker safety.

Liquid Separation and Disposal Step

A significant issue when dealing with liquid containing fast food service items is dealing with residual liquids and/or ice. An effective collection system must recognize that water and other contaminants will be resident in any collected material. A significant amount of liquid remaining with the material will enhance flora and fauna growth, will be more costly to transport, and will have to be disposed at the bailing site and potentially cause problems in downstream processing of the material. The challenge in liquid separation is two fold, first separation and second dealing with the separated liquid in a manner consistent with food sanitation standards.

The liquid separation and disposal step can occur in the waste collection device according to the present invention. The liquid separation system includes a receptacle that can be a perforated liner or container with holes, slits, vanes, ridges, weaves for liquid transfer from solids that are being collected. The liquids will be self-draining around the waste materials before, during, and/or after the waste material has been de-bulked. The design of the waste collection device will promote ease of use and sanitization of materials and liquids, and could include UV LED (ultra violet light emitting diode) devices and/or spray and powder dispensing mechanisms.

The waste material in the waste collection device may be agitated, spun, twisted, tossed, perforated and/or compacted to separate the liquid from the waste material. The waste material can be turned to sanitize the waste material with the application of spray anti-bacteria and/or UV. The waste collection device can be made from plastic, steel, poly, stainless steel, plastic, or other similar material which thickness can range from that of a plastic bag to the thickness of a permanent steel grate, and will be located in such a place in the container to collect the separated waste material that enters the process.

The liquid storage and transfer vessel (another subsystem) is designed to contain the water or liquid in a manner consistent with stringent health department regulations that govern food service establishments. The container will either store the liquid until the container can be removed and disposed of manually, be used as a receiving container with a direct drain to the floor, be used with a mechanism to pump the liquid from the vessel to a drainage or disposal area, and/or be a storage area for a liquid absorbing device that will absorb the liquid. For example, the absorbing device can absorb 10-100 times its own weight, be removable from the container without the person removing it being contaminated, and disposed of with other garbage or trash when the material is removed from the disposal receptacle sub-system. The liquid absorbing device will contain a hydroscopic material such as poly sodium acrylate. The device can be designed to a size and shape to collect the expected maximum flow of liquid. The storage system may be used to collect liquid from all individual receptacles from the waste collection device.

Packaging for Shipment Step

Fast food restaurants are not equipped to deal with "trash". Once the material has been effectively collected and processed it must be conveniently packaged for external storage and shipment. The package must be sanitary, convenient to use, and stout enough to withstand the rigors of handling by restaurant staff and waste recyclers/haulers. A separate package (e.g. plastic bag, liner, or other waste container) will be used to collect the primary bag having holes in it to allow self-draining of the liquid from the waste material. The package may be designed to preclude the growth of fungi and bacteria through the use of impregnated growth inhibitors, and/or self generated inert gas flooding.

The package for shipment can be a bag, box, or other device made from plastic, paper fibers, cloth etc. The packaging material can be slipped over or around the outside of the plastic bag, liner, or other waste container containing the waste material that will be recycled. The package can be open ended or sealed on one end. If open ended, then a sealing mechanism can be employed to either end or sides of the package to contain the material. Drawstrings, tape or other sealing mechanisms can be used to seal the package.

The package can be stored within or attached to the waste collection device so that the person emptying the material can just pull the packaging material up, down and/or around the plastic bag, liner, or other waste container. The package can be impregnated with materials that would reduce the microbial content on or around the collected waste material.

Identification, Tracking and Custody (Ownership) Step

Food service items are a desirable recycling feedstock, but the key to success is recycling them as segregated materials. Keeping track of the material is important for material custody and ownership, FDA tracking purposes, inventory control, transporting the materials, separating materials, locating the waste material, security, custodial transfer, and quality control. The ownership of the material will be achieved by contract between the store and group collecting the material, the owners of the in-store system, and/or other designated party who will be receiving the material for collecting, separating, and baling the waste material for further transfer and/or processing.

A RFID indicator or other identification method such as bar codes, bag colors, and/or markings is applied to the plastic bags, liner, or other waste containers so that a visual, sound, and/or identification wave can be picked up by a detecting device or person so the waste material can be identified, separated, and tracked. A preferred system uses radio frequency technology (RFID), or other electronic tagging methods or systems to enable tracking of the waste material through all stages of collection, separation, transportation and aggregation of the waste material. The RFID can be embedded in the packaging material, placed in the package at the store by a person, or automatically dropped into the package when a triggering event such as time, opening the door or pushing a button occurs. The information generated from this sub-system will be transferred to a central computer and can be collected by the store as store management information. This information can provide expected inventory, control over loss and proliferation of material to other parties, methods for payment of fees to stores and waste haulers, and prevent the material from becoming a commodity. The system can also be used for tracking other recyclable materials collected by the system, and then sold. The sending the RFID signal can be used to transfer of ownership of the waste material from the store to the waste recycling system.

Transport, Separating, Aggregation, Bailing and Tracking Bale Step(s)

The packaged waste material will be picked up at the store by various garbage/recyclable materials transporters (including OCB transporters) and/or dedicated transporter, group/contractor, and transported to a central location for separation from other materials, aggregating with like materials and bailing for further transport to the waste recycling plant. The separated packages of recyclable materials are recorded based on the unique electronic signatures or identifiers of their identification devices. This information is transferred to the computer thereby recording receipt of the waste material by the central processing/aggregation facility. This information will create an expected inventory, record the date of the material for determining aging and potential contamination by flora and fungi growth etc. developing a system to track and pay for the processing of the material and to make sure that that the material that is picked up at the store is not proliferated to other customers of the waste hauler. The dedicated transporter and group/contractor system would only be used in highly populated areas where compliance to the system is not working.

After the material is aggregated into one location, it will be baled and tagged for further transporting to a manufacturing/processing facility. The bale is sized for efficient transport by rail car, truck, boat, barges or other efficient transport, and tagged with bar codes, RFID indicators, or other identification devices, which will include information such as weight, number of bags, date and other information including the identification of the party sending the bale. The information on the tagged bale will determine the amount of payment to the aggregating company/group. Until transporting, the bales will be stored in a central area for a specified period of time. If the bales are stored longer than specified, then bales can be rejected due to sanitization issues.

The bags of waste material are recorded, separated, aggregated, baled and stored at the waste hauler/bailer utilizing the information that is generated from the RFID devices and/or other specific markings. The information transferred to the computer includes expected inventory, date of the waste material (i.e. aging) for determining levels of sanitization, and information for controlling waste material (i.e. to prevent proliferation of the waste material to other customers of the waste hauler).

A new RFID or other device or information forwarding mechanism will be generated and attached to each bale. This information will include identification of the party who has processed the bale; weight of bale; date baled, and other information as requested. This information will be used to track, transport, receive, and pay for the processing and transporting of the bale to a manufacturing/processing location.

Dis-Aggregation and Separation

Upon receipt at the manufacturing/processing facility, the bales of recyclable waste material are off loaded and identified based on information placed on the bale by the central collection and baling location. The collected bales are sampled for bacteria and other unwanted waste material. Next the bales are loaded into a singulation conveyor. Once the packages have been singulated they pass through a two sided (top and bottom) multiple water jet station, which cuts the external packaging material. The slit packages next move to a vibratory classifying screen, which separates the packaging material from the recyclable waste material. The packaging material is collected and recycled, or used as an energy source (e.g. for manufacturing/processing).

Preliminary Washing Step

The next step in processing the waste material is a washing step, which is performed using anti-bacterial/anti-fungal detergent and water. In this step agitation, water, and detergent are used to separate the recyclable waste from any residual food or drink contamination.

Pulping Step

The washed waste material is subjected to a pulping step using heat, steam, and chemicals to convert the washed material to pulp ready for use to make new paper products.

We claim:

1. A waste tracking and monitoring method, comprising:
   placing waste containers at a first location for collecting waste at the first location;
   electronically tagging each of the waste containers with an electronic tag;
   collecting waste into each of the electronically tagged waste containers;
   locating one or more detectors on one or more transportation vehicles for detecting each and every electronic tag of the waste containers being transported on each of the one or more transportation vehicles;
   electronically detecting each of the electronic tags of each and every of the waste containers continuously in real time using the one or more detectors of each of the one or more transportation vehicles during transportation from the first location through a second location;
   electronically tracking of the electronic tag of each and every of the waste containers containing the collected waste continuously in real time using the one or more detectors located within each of the one or more transportation vehicles during transportation of the waste containers from the first location to the second location; and
   identifying, monitoring, and routing each and every of the waste containers containing the collected waste continuously in real time using a waste collection computer network or system during transportation of the waste containers containing the collected waste from the first location through the second location.

2. The method according to claim 1, wherein the waste containers are disposable waste containers.

3. The method according to claim 1, wherein each of the electronic tags is configured to be wirelessly detected.

4. The method according to claim 1, further comprising placing the disposable waste containers into other waste containers located at the point of collection.

5. The method according to claim 4, wherein the one or more electronic devices is associated with each of the other waste containers.

6. The method according to claim 1, wherein the one or more electronic tags is an RFID tag.

7. The method according to claim 1, wherein the location of the waste containers are tracked during transportation of the waste container from the first location to the second location.

8. The method according to claim 1, further comprising communicating the electronic tracking of the waste containers using the one or more additional detectors located at the first location and/or the second location and connected to the waste collection computer network or system.

9. The method according to claim 1, further comprising scheduling the pickup of the waste collected in the waste container located at the point of collection.

10. The method according to claim 1, further comprising logging information regarding waste collected into the waste container.

11. The method according to claim 1, wherein the collected waste is monitored in real time during transportation from the first location to the second location.

12. The method according to claim 1, further comprising detecting the location of the collected waste using the multiple electronic sensors or detectors.

13. The method according to claim 1, wherein each of the waste containers is electronically tagged prior to placing the waste container at the first location.

14. The method according to claim 13, wherein each of the waste containers is electronically tagged by the manufacturer of the waste container.

15. The method according to claim 1, wherein each and every of the waste containers is identified, monitored, and routed during movement through a store, collection inside or outside the store, sorting and movement within a waste processing location or waste collection center, and movement within a recycling location.

\* \* \* \* \*